(12) United States Patent
Sercel et al.

(10) Patent No.: US 11,725,513 B2
(45) Date of Patent: Aug. 15, 2023

(54) SYSTEMS AND METHODS FOR RADIANT GAS DYNAMIC MINING OF PERMAFROST FOR PROPELLANT EXTRACTION

(71) Applicant: Trans Astronautica Corporation, Lake View Terrace, CA (US)

(72) Inventors: Joel C. Sercel, Lake View Terrace, CA (US); Anthony Price Longman, Castle Rock, CO (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

(21) Appl. No.: 17/450,444

(22) Filed: Oct. 8, 2021

(65) Prior Publication Data
US 2022/0082019 A1    Mar. 17, 2022

Related U.S. Application Data

(63) Continuation of application No. 16/534,321, filed on Aug. 7, 2019, now Pat. No. 11,143,026.
(Continued)

(51) Int. Cl.
*E21C 51/00* (2006.01)
*E21C 37/16* (2006.01)
(Continued)

(52) U.S. Cl.
CPC ............... *E21C 51/00* (2013.01); *B64G 4/00* (2013.01); *B64G 99/00* (2022.08); *E21C 37/16* (2013.01); *B64G 2001/1071* (2013.01)

(58) Field of Classification Search
CPC ....................................................... E21C 51/00
See application file for complete search history.

(56) References Cited

U.S. PATENT DOCUMENTS 2,930,187 A    3/1960   Chillson
2,975,592 A    3/1961   Fox
(Continued)

FOREIGN PATENT DOCUMENTS

AU    2007200666 A1    8/2007
CN         103075816       5/2013
(Continued)

OTHER PUBLICATIONS

Arnold, J.R., "Ice in the lunar polar regions", J. Geophys. Res 84., 1979, pp. 5659-5668.
(Continued)

*Primary Examiner* — Janine M Kreck
(74) *Attorney, Agent, or Firm* — Knobbe, Martens, Olson & Bear, LLP

(57) ABSTRACT

Systems and methods are disclosed for mining lunar and Martian polar permafrost to extract gas propellants. The method can comprise identifying a plurality of near-polar landing sites in craters in which the surface comprises permafrost in perpetual darkness, wherein such landing sites have perpetual sunlight available at altitudes of about 100 to 200 m. A mining outpost can be established in at least one of the sites and a high altitude solar array deployed at the landing site using a lightweight mast tall enough to generate near continuous power for the outpost. Systems and apparatus are disclosed for mining the permafrost at the landing sites using radiant gas dynamic mining procedures. The systems can comprise a rover vehicle with an integrated large area dome for cryotrapping gases released from the surface and multi-wavelength radiant heating systems to provide adjustable heating as a function of depth.

28 Claims, 17 Drawing Sheets

Related U.S. Application Data

(60) Provisional application No. 62/715,741, filed on Aug. 7, 2018.

(51) Int. Cl.
  *B64G 4/00* (2006.01)
  *B64G 99/00* (2009.01)
  *B64G 1/10* (2006.01)

(56) References Cited

U.S. PATENT DOCUMENTS

| | | |
|---|---|---|
| 2,991,617 A | 7/1961 | Nerad |
| 3,063,521 A | 11/1962 | Fuller |
| 3,064,418 A | 11/1962 | Sanders |
| 3,564,253 A | 2/1971 | Buckingham |
| 3,597,923 A | 8/1971 | Simon |
| 3,606,211 A | 9/1971 | Roersch et al. |
| 4,013,885 A | 3/1977 | Blitz |
| 4,135,489 A | 1/1979 | Jarvinen |
| 4,286,581 A | 1/1981 | Atkinson, Jr. |
| 4,263,895 A | 4/1981 | Colao |
| 4,449,514 A | 5/1984 | Selcuk |
| 4,459,972 A | 7/1984 | Moore |
| 4,528,978 A | 7/1985 | Robinson |
| 4,564,275 A | 1/1986 | Stone |
| 4,781,018 A | 11/1988 | Shoji |
| 4,815,443 A | 3/1989 | Vrolyk |
| 5,047,654 A | 9/1991 | Newman |
| 5,138,832 A | 8/1992 | Pande |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,593,549 A | 1/1997 | Stirbl et al. |
| 5,674,794 A | 10/1997 | Chatterjee |
| 5,751,895 A | 5/1998 | Bridges |
| 5,861,947 A | 1/1999 | Neumann |
| 5,982,481 A | 11/1999 | Stone |
| 6,057,505 A | 5/2000 | Ortabasi |
| 6,193,193 B1 | 2/2001 | Sorrano |
| 6,343,464 B1 | 2/2002 | Westerman |
| 6,350,973 B2 | 2/2002 | Wroe |
| 6,532,953 B1 | 3/2003 | Blackmon et al. |
| 6,669,148 B2 | 12/2003 | Anderman et al. |
| 6,742,325 B2 | 6/2004 | Kudija, Jr. |
| 7,207,327 B2 | 4/2007 | Litwin |
| 7,387,279 B2 | 6/2008 | Anderman et al. |
| 7,575,200 B2 | 8/2009 | Behrens et al. |
| 7,823,837 B2 | 11/2010 | Behrens et al. |
| 8,033,110 B2 | 10/2011 | Gilon et al. |
| 8,357,884 B1 | 1/2013 | Ethridge |
| 8,379,310 B2 | 2/2013 | Mori et al. |
| 9,010,317 B1 | 4/2015 | Gross |
| 9,187,191 B1 | 11/2015 | Jensen et al. |
| 9,222,702 B2 | 12/2015 | Goldberg |
| 9,266,627 B1 | 2/2016 | Anderson |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 | 7/2017 | Corrigan |
| 10,654,596 B1 | 5/2020 | Eller |
| 10,989,443 B1 | 4/2021 | Sercel et al. |
| 11,085,669 B2 | 8/2021 | Sercel |
| 11,143,026 B2 | 10/2021 | Sercel et al. |
| 11,280,194 B2 | 3/2022 | Sercel |
| 11,391,246 B2 | 7/2022 | Sercel et al. |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0224082 A1 | 12/2003 | Akopyan |
| 2004/0004184 A1 | 1/2004 | Schubert |
| 2004/0231716 A1 | 11/2004 | Litwin |
| 2007/0128582 A1 | 6/2007 | Anderson et al. |
| 2008/0023060 A1 | 1/2008 | Grumazescu |
| 2008/0156315 A1 | 7/2008 | Yangpichit |
| 2010/0038491 A1 | 2/2010 | Cepollina et al. |
| 2010/0163683 A1 | 7/2010 | Quine |
| 2010/0252024 A1 | 10/2010 | Convery |
| 2010/0269817 A1 | 10/2010 | Kelly |
| 2010/0294261 A1 | 11/2010 | Deforge |
| 2010/0319678 A1 | 12/2010 | Maemura et al. |
| 2011/0031238 A1 | 2/2011 | Segawa |
| 2011/0041894 A1 | 2/2011 | Liao |
| 2011/0127382 A1 | 6/2011 | Im |
| 2011/0220091 A1 | 9/2011 | Kroyzer |
| 2011/0315678 A1 | 12/2011 | Furuya |
| 2012/0155966 A1* | 6/2012 | Zillmer .............. B64G 4/00 405/128.85 |
| 2013/0021471 A1 | 1/2013 | Waterhouse |
| 2013/0206209 A1 | 8/2013 | Lasich |
| 2013/0239952 A1 | 9/2013 | Kroyzer |
| 2014/0138952 A1 | 5/2014 | Marumoto |
| 2014/0150651 A1* | 6/2014 | Velasco Valcke ..... B01D 5/006 95/126 |
| 2014/0174430 A1 | 6/2014 | Fitzgerald et al. |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 | 1/2016 | Ethridge |
| 2016/0076792 A1 | 3/2016 | Magaldi |
| 2016/0121395 A1 | 5/2016 | Kawanaka |
| 2017/0129579 A1 | 5/2017 | De Jong |
| 2018/0194626 A1 | 7/2018 | Berggren et al. |
| 2018/0265224 A1 | 9/2018 | Foulds et al. |
| 2019/0271228 A1* | 9/2019 | Sowers, Jr. ............ E21C 51/00 |
| 2021/0061494 A1 | 3/2021 | Belieres Montero |
| 2021/0333019 A1 | 10/2021 | Sercel et al. |
| 2022/0046612 A1 | 1/2022 | Sercel et al. |
| 2022/0089302 A1 | 3/2022 | Sercel et al. |
| 2022/0090500 A1 | 3/2022 | Sercel |
| 2022/0268524 A1 | 8/2022 | Small |
| 2022/0275721 A1 | 9/2022 | Sercel |
| 2022/0290635 A1 | 9/2022 | Sercel |

FOREIGN PATENT DOCUMENTS

| | | |
|---|---|---|
| EP | 2 177 846 | 4/2010 |
| EP | 2 195 583 | 3/2013 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |

OTHER PUBLICATIONS

Boyle, A., "Blue Origin Space venture slips in a sneak peek at design of Blue Moon lunar lander", Apr. 5, 2017, https://www.geekwire.com/2017/blue-origin-sneak-peek-blue- moon-lunar-lander/.

Boyle, A., "Jeff Bezos lays out his vision for city on the moon, complete with robots", May 20, 2017,https://www.geekwire.com/2017/jeff-bezos-blue-origin-moon/.

Bussey, D. B. J., et al., "Permanent shadow in simple craters near the lunar poles," Geophysical Research Letters, 2003, vol. 30, No. 6, 1278, pp. 11-1-11-4.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA Space and Astronautics Forum and Exposition, 2018,in 13 pages.

Cohen, Marc M., et al, "Asteroid Mining," AIAA 2013-5304, presented at AIAA Space 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

(56) References Cited

OTHER PUBLICATIONS

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.
Craft, J., et al. "Percussive digging systems for planetary research" IEEE Aerospace and Electronic Systems Magazine, 2010, vol. 25 pp. 21-26.
Crawford, I.A., Lunar resources: A review. Progress in Physical Geography, 39(2):137-167, 2015.
David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/30582-asteroid-mining-water-propulsion.html>.
Duke, M., et al., "Mining of lunar polar ice", 36th AIAA Aerospace Sciences Meeting and Exhibit, 1998, pp. 1069.
Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.
Fabbrocino, F., et al., "Optimal prestress design of composite cable-stayed bridges". Composite Structures, 2017, vol. 169, pp. 167-172.
Feldman, W. C., et al., (1998). "Fluxes of fast and epithermal neutrons from Lunar Prospector", Evidence for water ice at the lunar poles, science 281, 1998, pp. 1496-1500.
Fincannon, J., "Lunar Polar Illumination for Power Analysis", NASA/TM, 2008-215446, https://ntrs.nasa.gov/archive/nasa/casi.ntrs.nasa.gov/20080045536.pdf.
Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.
Gertsch, R.E., et al, "Near Earth Resources," In Near Earth Objects, Annals of the New York Academy of Science, vol. 822, p. 468-510, 1997.
Gertsch, R.E., et al., "Mining near Earth resources," In Near Earth Objects, Annals of the New York Academy of Sciences, vol. 822, p. 511-537, 1997.
Gläser, P., et al., "Illumination conditions at the lunar poles: Implications for future exploration". Planetary and Space Science, in press, 2017, https://doi.org/10.1016/j.pss.2017.07.006.
Goyal, R., et al., "Modeling of tensegrity structures", Journal of Open Source Software, 2019, vol. 4(42), pp. 1613.
Goyal, R., et al., "Tensegrity system dynamics with rigid bars and massive strings", Multibody System Dynamics, 2019, vol. 46(3) pp. 203-228.
Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.
Hayne, P. O., et al., "Diviner Lunar Radiometer Observations of the LCROSS Impact", Science 330, 2010, pp. 477.
Heiken, G.H., et al., "Lunar sourcebook—a user's guide to the moon". NASA,. Cambridge, England, Cambridge University Press, 1991, vol. 753, pp No individual items are abstracted in this volume.
Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.
Lewis, J.A., "Hard Choices for Manned Spaceflight: America as Icarus", http://csis.org/files/publication/140508_Lewis_HardChoicesMannedSpaceflight_Web.pdf, 2014.
Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).
Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.
Mazarico, E., et al., "Illumination Conditions of the Lunar Polar Regions Using LOLA Topography." Icarus, vol. 211, No. 2, 2011, pp. 1066-1081., doi: 10.1016/j.icarus. 2010.10.030.
Nagase, K., et al., "Minimal mass tensegrity structures", The International Association for Shell and Spatial Structures, 2014, vol. 55(1), pp. 37-48.
Pike R.J., "Crater dimensions from Apollo data and supplemental sources". The Moon, 1976, vol. 15, pp. 463-477.
Pike, R.J., "Depth/diameter relations of fresh lunar craters: Revision from spacecraft data", Geophysical Research Letters, 1974, vol. 1(7), pp. 291-294.
Rapp, D., "Use of Extraterrestrial Resources for Human Space Missions to Moon or Mars (Springer Praxis Books / Astronautical Engineering)" published Nov. 20, 2012.
Reinhold; A Solar Powered Station At A Lunar Pole; Feb. 18, 2021; https://theworld.com/~reinhold/lunarpolar.html; 7 pages.
Rimoli, J.J., et al., "Mechanical response of 3-dimensional tensegrity lattices", Composites Part B: Engineering, 2017, vol. 115, pp. 30-42.
Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.
Rostami, J., et al., "Lunar tunnel boring machines", In Earth and Space 2018: Engineering for Extreme Environments, American Society of Civil Engineers, pp. 240-252, 2018, Reston, VA,.
Sabelhaus, A.P., et al. "Model-predictive control of a flexible spine robot", American Control Conference, 2017, IEEE, pp. 5051-5057.
Sercel, "Demonstration of "Optical Mining" For Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the Iro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Stoica, A. et al., "TransFormers of Extreme Environments and Their Integration in a Solar Power Infrastructure". AIAA Space 2016, AIAA Space Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Vasavada, A. R., et al., "Near-Surface Temperatures on Mercury and the Moon and the Stability of Polar Ice Deposits". Icarus, 1999, vol. 141, pp. 179-193.

(56) References Cited

OTHER PUBLICATIONS

Yildiz, K., et al., "Effective beam stiffness properties of n-strut cylindrical tensegrity towers", AIAA Journal,2019, vol. 57(5), pp. 2185-2194.
Yildiz, K., et al., "A novel deployment strategy for tensegrity towers", AIAA Spacecraft Structures Conference, 2018, pp. 0693.
International Search Report/Written Opinion; dated Jan. 30, 2020; International Application No. PCT/US2019/045526; Filed Aug. 7, 2019; in 9 pages.
International Search Report/Written Opinion; dated Apr. 7, 2021; International Application No. PCT/US2021/013125; Filed Jan. 12, 2021; in 16 pages.
Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.
Badescu, V., "Asteroids: Prospective Energy and Material Resources," Jul. 14, 2013, ISBN-13:978-3642392438.
Binzel, R., "Human Spaceflight: Find Asteroids to get to Mars." Nature 514, 559-561, Oct. 29, 2014.
Bliss, T., et al. "Experimental validation of robust resonance entrainment for cpg-controlled tensegrity structures." IEEE Transactions On Control Systems Technology, 2012, vol. 21(3), pp. 666-678.
Bottke, W.F., et al., Debiased orbital and Absolute Magnitude Distribution of the near-Earth objects, Icarus 156, 399-433, 2002.
Bowersox, Kenneth and NASA Advisory Council Committee on Human Exploration and Operations, "NASA Advisory Council Finding on NASA Human Exploration Strategy," from the Council Public Deliberation, Jul. 31, 2014.
Brophy, J., et al, "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.
Brown, P., et al., The Flux of small near-Earth objects colliding with the Earth, Nature 420, 294-296, 2002.
Cassapakis, C.G., et al., "A Power Antenna for Deep Space Missions," Solar Engineering Editors: J.H. Davidson and J. Chavez. Book No. HO1046, 1996.
Ceruti, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI:10.5545/sv-jme.2014.2063; in 11 pages.
Crusan, J., "an Evolvable Mars Campaign" NASA Presentation, Jul. 2014, available at https:/www.nasa.gov/sites/default/files/files/20140429-Crusan-Evolvable-Mars-Campaign.pdf.
Ehricke, K.A., "The Solar-Powered Space Ship," ARS Paper 310-56, Jun. 1956.
Eldred, et al., "Alternative Scenarios Utilizing Nonterrestrial Resources", Space Resources Scenarios NASA, 1992.
Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.
Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.
FAA 2012 Commercial Space Transportation Forecasts. Available at http://www.faa.gov/about/office_org/headquarters_offices/ast/media/The_Annual_Compendium_of_Commercial_Space_Transporation_2012.pdf.
Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.
Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.
Garenne, A.B., et al, "The Abundance and Stability of Water in Type 1 and 2 Carbonaceous Chondrites," CI, CM, and CRI Geochimica et Cosmochimica Acta 137, 93-112, 2014.
Gertsch, L.S., et al., Laboratory Demonstration and Test of Solar Thermal Asteroid ISRU, funded NASA Early Stage Innovations Space Tech Research Grants, Proposed 2014, funded Jan. 2015.
Goyal, R., et al., "Analytical study of tensegrity lattices for mass-efficient mechanical energy absorption", International Journal of Space Structures, 2018.
Granvik et al., Abstract, IAU-Symposium: Complex Planetary Systems, Jul. 7-11, 2014, Namur, Belgium.
Granvik, M., et al., "The population of natural Earth satellites," Icarus, 2012.
Griffin, M.D., et al., "Space Vehicle Design, Second Edition (AIAA Education)", pp. 29-37, Feb. 23, 2004.
GRIP; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.
Grossman, G., et al., "Inflatable Concentrators for Solar Propulsion and Dynamic Space Power." Journal of Solar Energy Engineering, Nov. 1990, vol. 112/229.
Harwood, William, "NASA's proposed asteroid retrieval mission outlined." Posted in Space Flight Now: Apr. 6, 2013. Available at https://spaceflightnow.com/news/n1304/06asteroid/.
Interbartolo III. Michael A, et al, "Prototype Development of an Integrated Mars Atmosphere and Soil-Processing System", Journal of Aerospace Engineering, Jan. 2013, vol. 26(1), pp. 57-66.
Lawrence, D. J., et al., "Evidence for water ice near Mercury's north pole from messenger Neutron Spectrometer measurements". Science 339, 2013, pp. 292-296.
Lewis, J.A., "Logistical Implications of Water Extraction from Near-Earth Asteroids," Proceedings of the Eleventh SSI-Princeton Conference, May 12-15, 1993.
Masten, Jun. 17, 2021, Break the ice: Masten designs rocket mining system to extract lunar water, blog, 8 pp.
Mazanek et al., "Asteroid Retrieval Mission Concept—Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.
Mommert, M., et al., "Constraining the Physical Properties of Near-Earth Object 2009 BD," The Astrophysical Journal, vol. 786, No. 2.
NASA Report from Office of the Chief Technologist, Emerging Space: The Evolving Landscape of 21st Century American Spaceflight, http://images.spaceref.com/docs/ 2014/Emerging_Space_Report.pdf.
NASA, "Asteroid Redirect Mission Reference Concept," 2013.
Norton, B., "Harnessing Solar Heat," Springer, pages C1-xiii, 39 and 48-73, ISBN 978-007-7275-5, 2013.
Sanders, Oct. 10, 2019, NASA Lunar ISRU Strategy, presented at the What Next for Space Resource Utilization? Workshop, Luxembourg, 20 pp.
Schlaich, M., "The messeturm in Rostock—A tensegrity tower", Journal of the International Association for Shell and Spatial Structures, 2004, vol. 45(2), pp. 93-98.
Sercel, Apr. 22, 2015, Worker Bees: thin-film solar thermal technology enables water-based cis-lunar transportation architecture, ICS Associates Inc., 109 pp.
Sercel, J.C., "Solar Thermal Propulsion for Planetary Spacecraft", presented at the JANNAF Propulsion Conference, San Diego, CA, Apr. 9-12, 1985.

(56) References Cited

OTHER PUBLICATIONS

Sercel, J.C., et al., "APIS(Asteroid Provided in-Situ Supplies): 100MT of Water, One Falcon 9 Launch" NIAC Phase 1a proposal submitted Nov. 2014.

Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.

Sercel; Time Dependent Finite Difference Modeling of Outgassing of Asteroids via Bulk Heating; 978-1-5386-2014-4/18/$31.00 © 2018 IEEE; I 14 pages.

Shao, M.B., et al., "Finding very Small Near-Earth Asteroids using Synthetic Tracking," Astrophysics .J 782:1, 2014, arXiv, 1309.3248.

Shapiro, I and the Committee to Review Near-Earth Object Surveys and Hazard Mitigation Strategies. Final Report, National Research Council, National Academies Press, 2010.

Shoji, J. M., et al., "Solar Thermal Propulsion Status and Future", AIAA-92-1719, AIAA Space Programs and Technologies Conference, Mar. 1992.

Staugaitis, C., et al., "Mechanical and Physical Properties of the Echo II Metal-Polymer Laminate (NASA TND-3409)," NASA Goddard Space Flight Center, 1966.

Thomas, M. et al., "Scaling Characteristics of Inflatable Paraboloid Concentrators", Presented at the Second ASME-JSES-JSME International Solar Energy Conference, Reno, Nevada, Mar. 17-22, 1991.

Ulas et al., 2013, Numerical analysis of regenerative cooling in liquid proellant rocket engines, Aerospace Science and Technology 24(1):187-197.

Wihite, Alan, et al., Evolved Human Space Exploration Architecture Using Commercial Launch/Propellant Depots, 63rd International Astronautical Congress, Naples, Italy, 2012.

Zacny; Asteroid Mining; AIAA Space 2013 Conference and Exposition Sep. 10-12, 2013, San Diego, CA; AIAA 2013-5304; in 16 pages.

Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.

\* cited by examiner

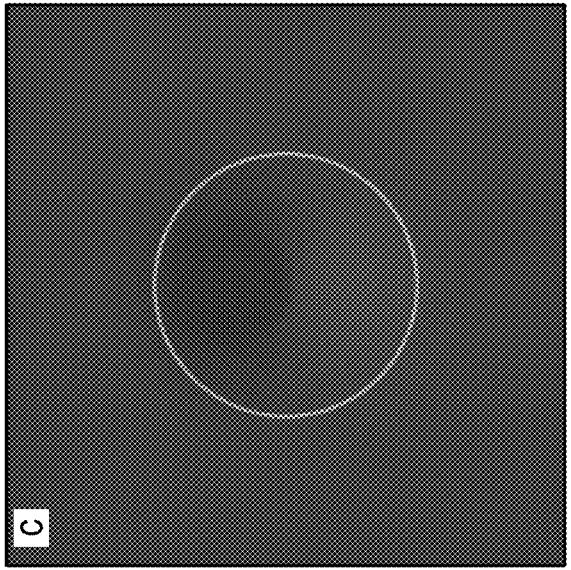
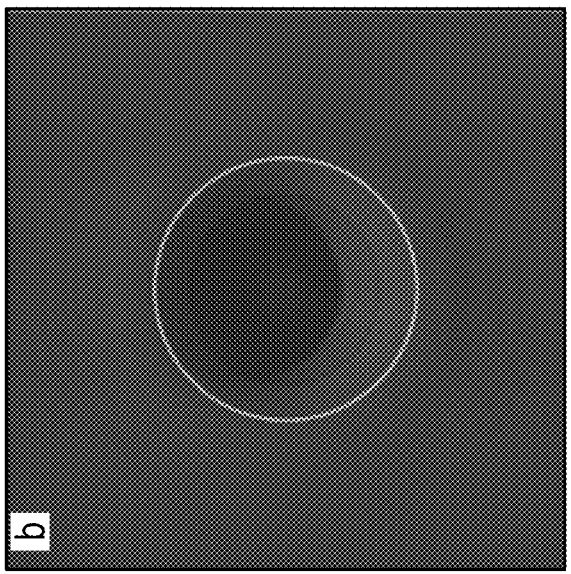
Plan View Showing Topographic Slope and Shadowing for a 1 km Diameter Crater at 85° Latitude as a Function of Degradation State
Have More Area in Shadow but Steep Non-Traversable Slopes. Moderately Degraded Craters
Combine High Shadow Fraction with Modest Slopes, while Highly Degraded Craters
Have Little to no Permanent Shadow
FIG. 13A
FIG. 13B
FIG. 13C

SYSTEMS AND METHODS FOR RADIANT GAS DYNAMIC MINING OF PERMAFROST FOR PROPELLANT EXTRACTION

CROSS-REFERENCE TO RELATED APPLICATION

This application is a continuation of U.S. patent application Ser. No. 16/534,321, issuing as U.S. Pat. No. 11,143,026, which is based upon and claims the benefit of priority from U.S. Provisional Patent Application No. 62/715,741 filed on Aug. 7, 2018. Any and all applications for which a foreign or domestic priority claim is identified in the Application Data Sheet as filed with the present application are hereby incorporated by reference under 37 CFR 1.57. The entire contents of each of the above is hereby incorporated herein by reference and made a part of this specification for all purposes.

FIELD

The present disclosure relates to systems, methods, apparatus, and techniques for the in situ lunar or Martian removal of water from permafrost, e.g., for the purpose of generating propellants.

BACKGROUND

Human space exploration is too expensive. Without a major change in strategy, NASA's budget will not support an exciting exploration program that can justify its own existence. It has been estimated that up to 80% of the cost of establishing and maintaining a human outpost in deep cislunar space is in launching and transporting propellant from the surface of the Earth. If plentifully available in cislunar space, water can be electrolyzed into O2 and H2 and liquefied for use in cryogenic propulsion, or used directly as propellant in solar thermal rockets, to provide a breakthrough in affordable transportation. Historically the lunar surface has been viewed as an unpromising source of propellant feedstocks due to the difficulties of providing power during the 14-day lunar night and due to the paucity of accessible volatiles in the lunar maria.

SUMMARY

Recent work however has shown that in lunar polar regions there may be vast areas with large quantities of frozen water in close proximity to peaks that are in nearly perpetual sunlight. This promises near continuous solar power for in-situ resource utilization (ISRU) and other operations. Unfortunately, the multi-kilometer geographic separation between the perpetually lit peaks and the permafrost on the bottom of large craters creates significant power distribution challenges. If the power distribution challenges can be circumvented, it will greatly reduce the cost of ISRU for lunar water and that will vastly reduce the cost of developing and maintaining a lunar outpost.

NASA studies of water extraction from permafrost have focused on robotic analogs to terrestrial strip mining. In various embodiments of the present method and systems, tractor-like robotic vehicles mechanically excavate the permafrost and then transport the excavated material to hoppers where it is heated to extract the volatiles. These approaches may be technically feasible but suffer from severe engineering and economic challenges due to issues associated with excavator vehicle mass and maintenance stemming from the extreme hardness (estimated to be up to 50 MPa) of the permafrost and the cold conditions of the work environment (as low as 30 K on the surface of the Moon). Support for such vehicles would be unaffordable on the Moon. The present embodiments offer a viable system for extracting water from lunar polar material.

In some embodiments, the lunar polar propellant mining outpost (LPMO) is a breakthrough mission architecture that promises to greatly reduce the cost of human exploration and industrialization of the moon. LPMO can include at least two advantages. The first advantage stems from the present analysis based on NASA lunar missions, which suggests that there are large (hundreds of square-meter) landing areas in small (0.5 to 1 km) near-polar craters on which the surface is permafrost in perpetual darkness but with perpetual sunlight available at altitudes of 100 to 200 meters. In these prospective landing sites, deployable solar arrays held vertically into the sunlight on masts (lightweight and feasible in lunar gravity) can provide nearly continuous power. Accordingly, a large lander, such as the united launch alliance xeus or blue moon, with a modestly sized outpost could sit on mineable permafrost with solar arrays deployed above in perpetual sunlight without the need to separate power supply from the load.

The second enabling advantage of the present methods and systems related to LPMO is radiant gas dynamic (RGD) mining. RGD mining, as set forth in various embodiments herein, solves the problem of economically and reliably prospecting and extracting large quantities (thousands of metric tons/year) of volatile materials from lunar regolith using landed packages of just a few tons each. To obviate the aforementioned problems of mechanical digging and excavation, RGD mining uses a combination of radio frequency (rf), microwave, and infrared radiation to heat permafrost with a depth-controlled heating profile. This sublimates the ice and encourages a significant fraction of the water to migrate as vapor upward out of the regolith into cryotraps where it can be stored in liquid form. RGD mining technology is integrated into long duration electric powered rovers as depicted in FIG. 1.

In use, the vehicles stop at mining locations and lower their collection domes to gather available water from an area before moving on. When on-board storage tanks are full, the vehicles return to base to empty tanks before moving back to continue harvesting. The rover can be battery operated and recharge at base or carry a laser receiver powered by a remote laser. Based on these innovations, LPMO promises to vastly reduce the cost of establishing and maintaining a sizable lunar polar outpost that can serve first as a field station for NASA astronauts exploring the moon, and then as the beach head for American lunar industrialization, starting with fulfilling commercial plans for a lunar hotel.

Also disclosed is a method for implementing RGD in lunar, Martian, or other regions known to have permafrost.

BRIEF DESCRIPTION OF THE DRAWINGS

FIGS. 13A-13C are plan views of various lunar craters at 85 degrees latitude illustrating their topographic slope and shadowing.

The figures, drawings and tables, including the text thereon, set forth at the end of this disclosure, are referenced herein and made a part of this application. The figures, drawings and tables, and their associated descriptions, are provided to illustrate the various embodiments of the invention and not to limit the scope of the invention.

DETAILED DESCRIPTION

Figure 1:
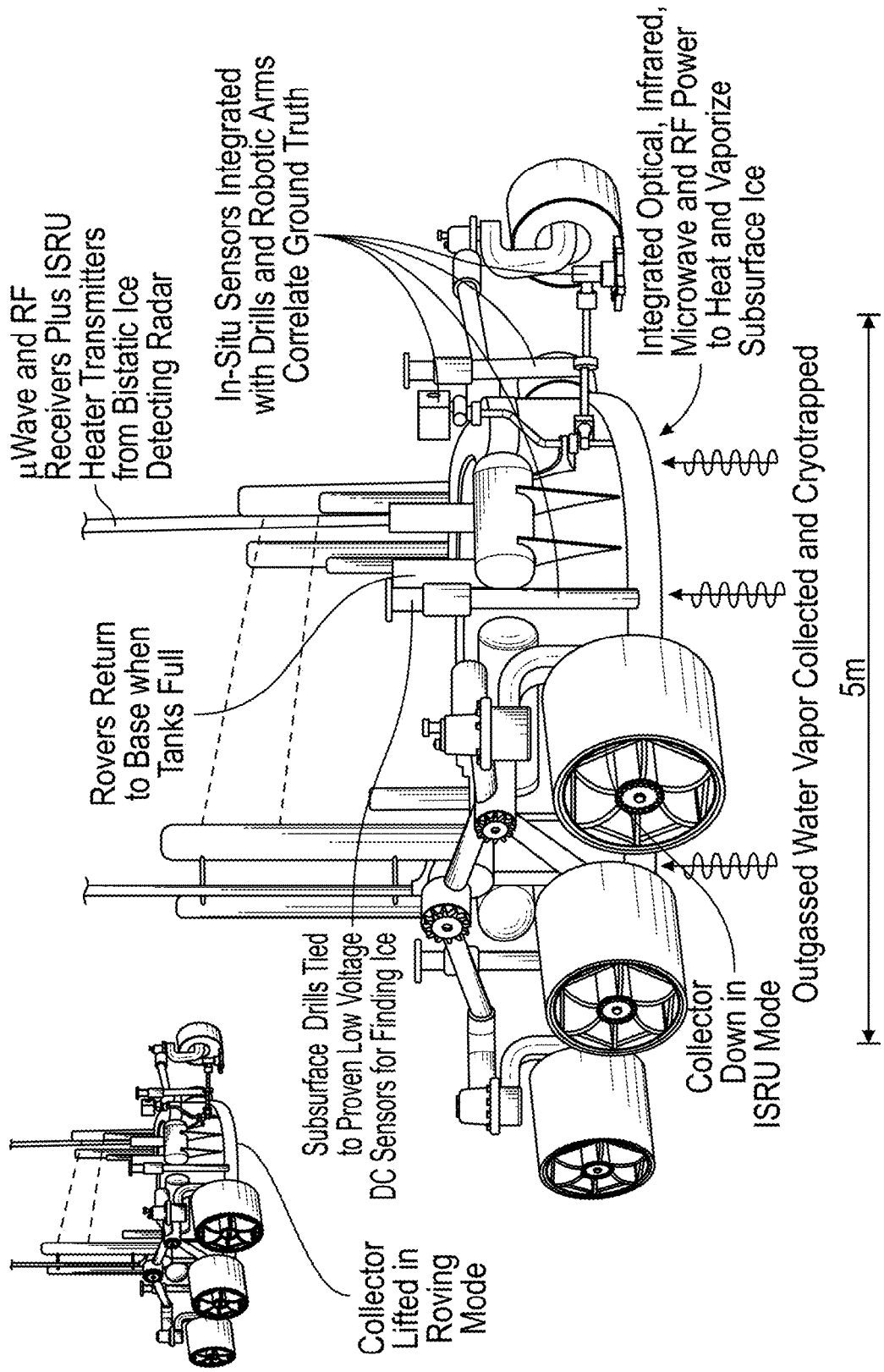
FIG. 1 illustrates in general one embodiment of a rover vehicle for implementing radiant gas dynamic (RGD) mining in support of LPMO.

FIG. 1 illustrates one embodiment of an apparatus and system for a rover vehicle implementing RGD. Other embodiments are described below in connection with other figures. By way of introduction, various methods for identifying, selecting and landing lunar rovers in craters containing permafrost is first discussed.

Lunar polar water is thought to be delivered to cold traps by exospheric transport. Measurements from lunar orbit have provided evidence for this water. Neutron spectroscopy has revealed an excess of hydrogen within the top 1 m of the surface in polar regions. The LCROSS impactor ejected material with about 6% of H2O by mass Laser reflectivity and Lyman-alpha from starlight reveals bright material in some of the cold. More recent studies have found direct evidence for surface ices or frost. Planet Mercury and dwarf planet Ceres have PSRs that are known to contain ice, which further strengthens the case for ice on the Moon.

Figure 2A:
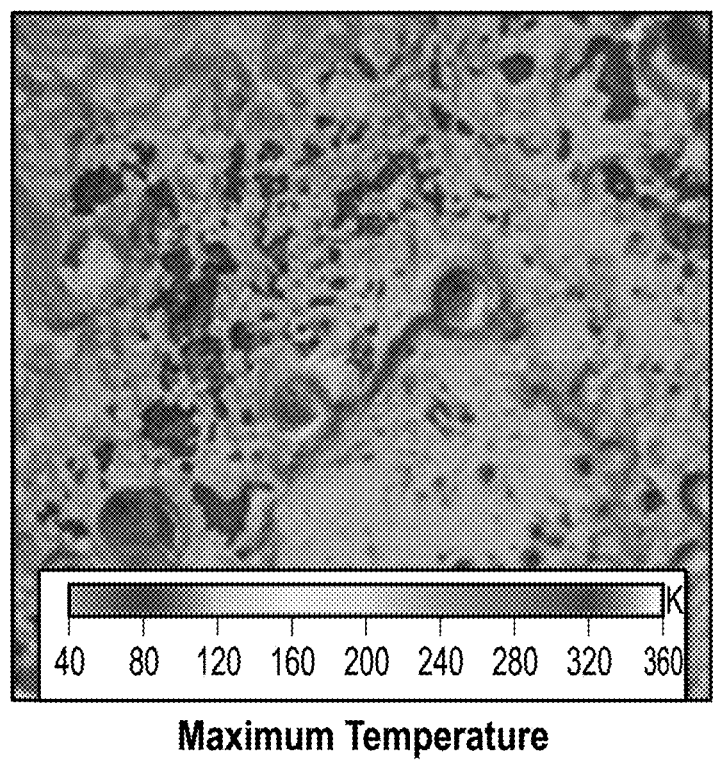
FIGS. 2A-2D illustrate various aspects of lunar polar topology, illumination, and temperature.
Figure 2B:
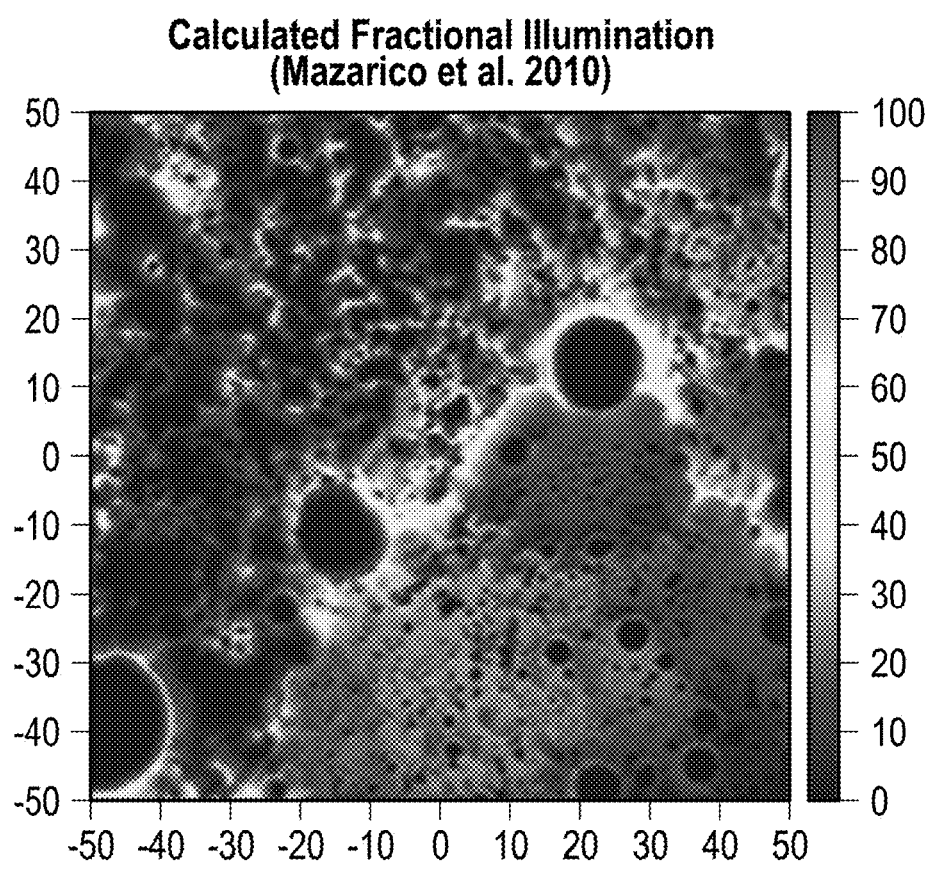
Figure 2C:
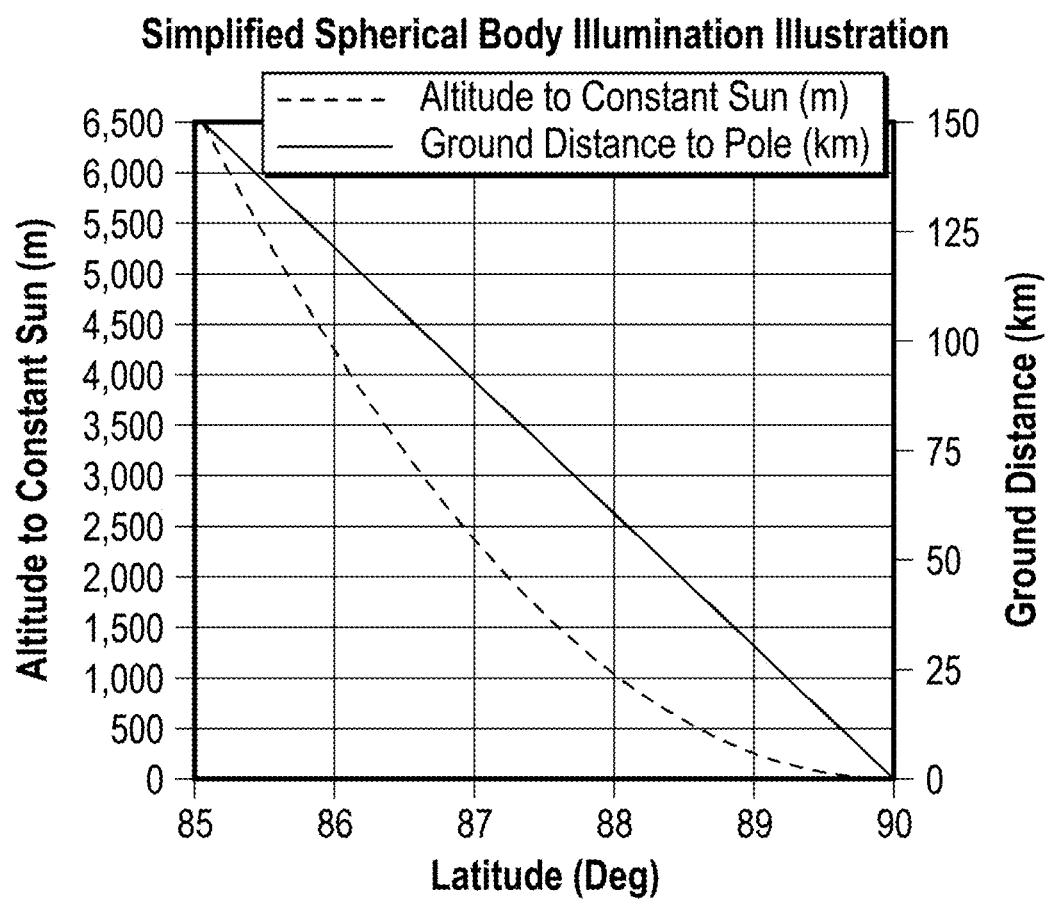
Figure 2D:
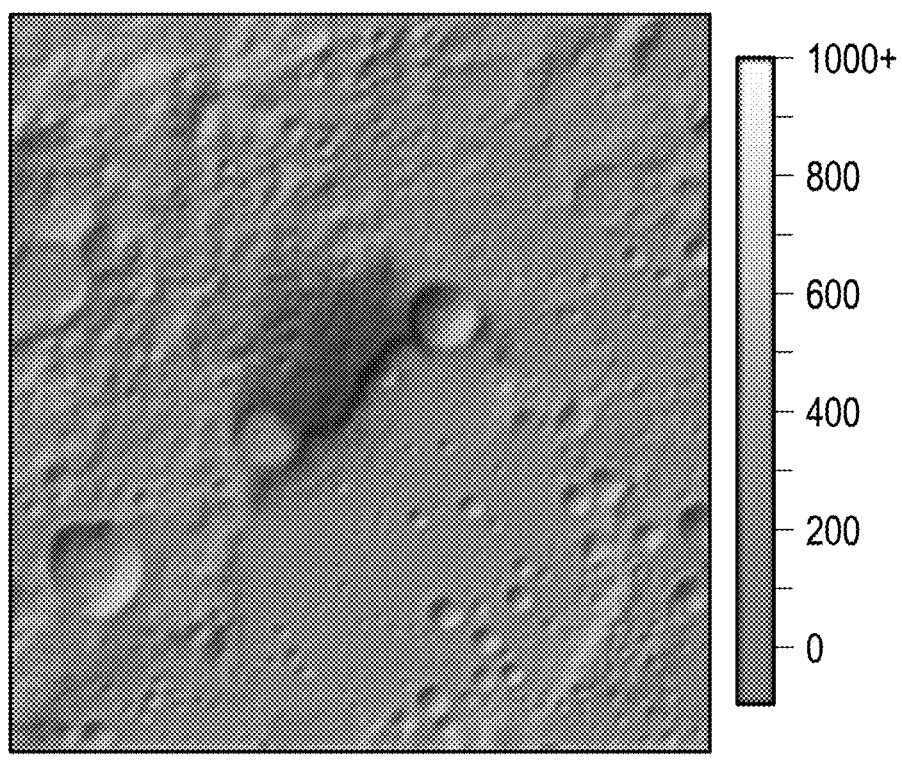

FIGS. 2A-2D provide some illustrative examples of illumination conditions and temperatures near the lunar north pole down to a latitude of 87.5°. FIG. 2A shows the maximum daytime temperature. As shown, many permanently shadowed regions (PSRs) are cold enough (<120K) to trap water ice at a vapor pressure low enough for preservation over geologic time scales. FIG. 2B shows that near the north pole there are areas in virtually perpetual sunlight which are near areas in perpetual darkness. FIG. 2C is an illustrative simplified calculation showing the altitude required above ground level to achieve perpetual sunlight given a perfectly spherical Moon and neglecting tilt and wobble. This gives a rough idea of how high masts on top of features need to be in order to experience nearly continuous sunlight. FIG. 2D shows altitude above the actual topographic ground level near the lunar north pole as needed to achieve nearly continuous sunlight. In FIG. 2B, shadows from adjacent topographic features, lunar tilt, wobble, and precession are considered while they are not included in FIG. 2D.

Solar panels mounted on high towers have been proposed in the past and concluded that at some locations height gains of just 10 meters provide dramatically improved average illumination. It has been suggested by others that additional improvement only occurs for much larger towers, beyond the practical distance of few hundred meters. However, according to various methods described herein, solar tower height of 10 meters can result in even more dramatic improvement in illumination if placed in craters starting from shallow craters with floors in permanent darkness at high altitude and high latitude. Based on a power law size distribution model, according to the present methods, there are between 500 and 1,500 craters with diameters in the 0.5 to 1.5 km range above 85° of latitude. Current methods involve identifying and selecting, for RGD implementation, small, high altitude craters at which significant benefit from a 10 meter altitude boost begins as soon as the height of the tower reaches above the crater rim. These methods are described in more detail below in connection with FIGS. 11-13.

Radiant Gas Dynamic Mining

RGD is a breakthrough because mass, complexity, cost, and failure rate of mechanical digging equipment cannot be practical or cost effective in ISRU systems supporting human exploration. RGD mining is a potential revolutionary improvement because it minimizes use of excavation equipment and replaces those moving parts with radiative energy transmitters. This improvement puts a space program (e.g., NASA) in position to move forward with flight demonstration of a high fidelity prototype, possibly performing ISRU on a miniature rover on the Moon.

RGD mining is a practical approach to extract volatiles from Lunar or Martian permafrost, with applications for outer solar system bodies. RGD mining combines the three functions of: characterization of geotechnical properties, excavation, and extraction of water. In addition, RGD mining provides trapping and collection of the water in a single process while eliminating the need for mechanically excavating regolith substrate.

RGD mining combines radio frequency (RF), microwave, infrared, and optical radiation to produce heating at variable depths, with a surface-enclosing cryotrap and instrumentation. In mission applications, equipment can be integrated into a roving vehicle that can harvest water down to depths of a few meters using vapor phase extraction and cryotrapping. Water vapor released from subsurface material by RF and microwave heating then diffuses through RF-warmed overburden before being cryotrapped in the covering dome.

Rover Vehicles

In one embodiment illustrated in FIG. 1, a rover vehicle with radiant gas dynamic (RGD) mining equipment includes various advantageous features. Such features include: integrated large area dome shaped gas trapping enclosure with conformal surface contact for cryotrapping gases released from the surface; multi-wavelength radiant heating systems to provide adjustable heating as a function of depth; drill systems for deploying subsurface RF sensors and RF transmitter antennas; mast deployed overhead housing sensing instruments for surveying near the vehicle to find water; in-situ sensors for providing ground truth against mast deployed range sensors, and overhead satellite remote sensing to integrate global, local and in-situ resource maps. Other embodiments may incorporate one or more of these features in various combinations.

Rover-based RGD mining system would characterize the local geotechnical regolith properties and integrate local RF and hyperspectral sensing with overhead remote sensing. In the embodiment of FIG. 1, the rover is equipped with drills, a robotic arm, and sensors equivalent to those in use on NASA JPL Mars rovers. The rover could also be equipped with deployable sensor masts with RF, microwave, and hyperspectral sensors. RF and microwave sensors work as local radar receivers when RF and microwave ISRU power sources are in use. These features allow for the mapping of the local subsurface environment around the rover out to a distance of several hundred meters for determining local frozen water content, which has a dramatically different dielectric constant than dry regolith or rock. Measurements can be correlated with radar measurements of the Moon or overhead instruments such as the Shallow Subsurface Radar (SHARAD) instrument onboard the Mars.

Electromagnetic emanations from the ISRU system can be used in a bistatic radar mode with overhead satellite receivers and NASA Deep Space Network for local resource mapping. In RGD methods, correlation with local ground truth measurements made by the rover is possible, thereby allowing for confident interpretation of global remote sensing data.

Figure 3:
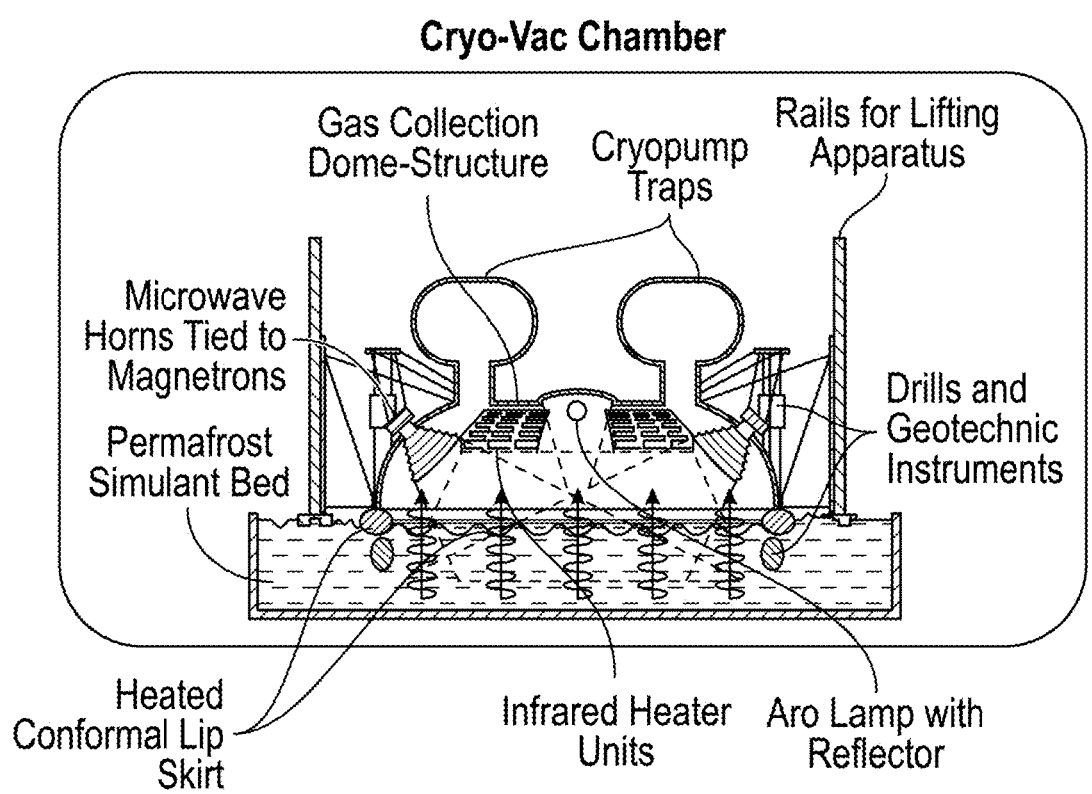
FIG. 3 is a diagram showing various features of a cryotrapping system implementing RGD mining which can be integrated into a rover or other vehicular device, or into a standalone, fixed, or portable outpost.

With further reference to FIG. 1, the rover vehicle stops at a location and lowers its collection dome to collect available water from an area before moving on. However, it should be noted that the principles of RGD mining may also be implemented in other embodiments involving non-vehicular apparatus and systems, such as standalone or portable mining outposts, or fixed mining systems. See, for example, the RGD implementation of FIG. 3. The system of FIG. 3 comprises a testing device, including a vacuum chamber and simulated permafrost bed. However, this figure also illustrates how the components of RGD mining can be implemented in a non-vehicular system, rather than the rover of FIG. 1.

Returning to FIG. 1, if the rover stops at a location where frozen water is near the surface, a combination of infrared and optical heating are used to vaporize it. As near-surface water is consumed, subsurface water can be accessed by microwave and then longer wavelength RF heating. In case of relatively deep water covered by up to 1-2 meters of regolith, microwave power can propagate through intervening regolith, which is largely dielectric material. Water vapor will diffuse through intervening regolith as long as the temperature is above the cryotrapping temperature of water.

As illustrated in FIG. 1, intervening layers must be warmed by combination of RF and microwave heating. If water does refreeze above its long term storage depth, it changes bulk dielectric properties of intervening layers and allows microwave heating to work more effectively to re-vaporize water. When on-board storage tanks are full, the vehicle returns to base to empty tanks before moving back out to continue harvesting resources. For Lunar applications it is assumed the vehicle will be operating in or near dark craters and powered by a laser system located on a peak of eternal light.

Microwave extraction methods have been proposed in the past; however, they typically require prior excavation of substrate material or do not include methods to prevent re-trapping of water by cold regolith. By using multi frequency radiant system, RGD provides a variable heating profile that sublimates water vapor in layers from the top down and encourages evolved water to migrate into cryotraps in the vehicle of FIG. 1, while minimizing refreezing of water vapor in surrounding substrate.

RGD is a breakthrough since it provides practical and cost effective apparatus, systems, and methods in an ISRU system supporting large-scale human exploration or space operations for foreseeable future. The extreme hardness of frozen soil or water-bearing regolith is estimated to be $\geq 50$ MPa. Conventional excavation of hard permafrost requires heavy complex mining equipment with masses in tens to hundreds of tons and suffers frequent breakdowns requiring replacement parts and human maintenance. RGD mining minimizes the number of moving parts, especially, as in conventional mining, parts for performing strenuous mechanical work at expected cryogenic temperatures in presence of dust and grit. State of the art mining methods is spending billions to excavate grams of material. RGD is cost effective because it utilizes aerospace structures made of lightweight materials, while conventional mining excavation equipment must be made of heavy grade steel.

While certain embodiments have been described, these embodiments have been presented by way of example only, and are not intended to limit the scope of the present invention. Accordingly, the breadth and scope of the present invention should be defined only in accordance with the claims and their equivalents.

Dome Structure, Microwave Performance, and Skirt Design

Figure 4A:
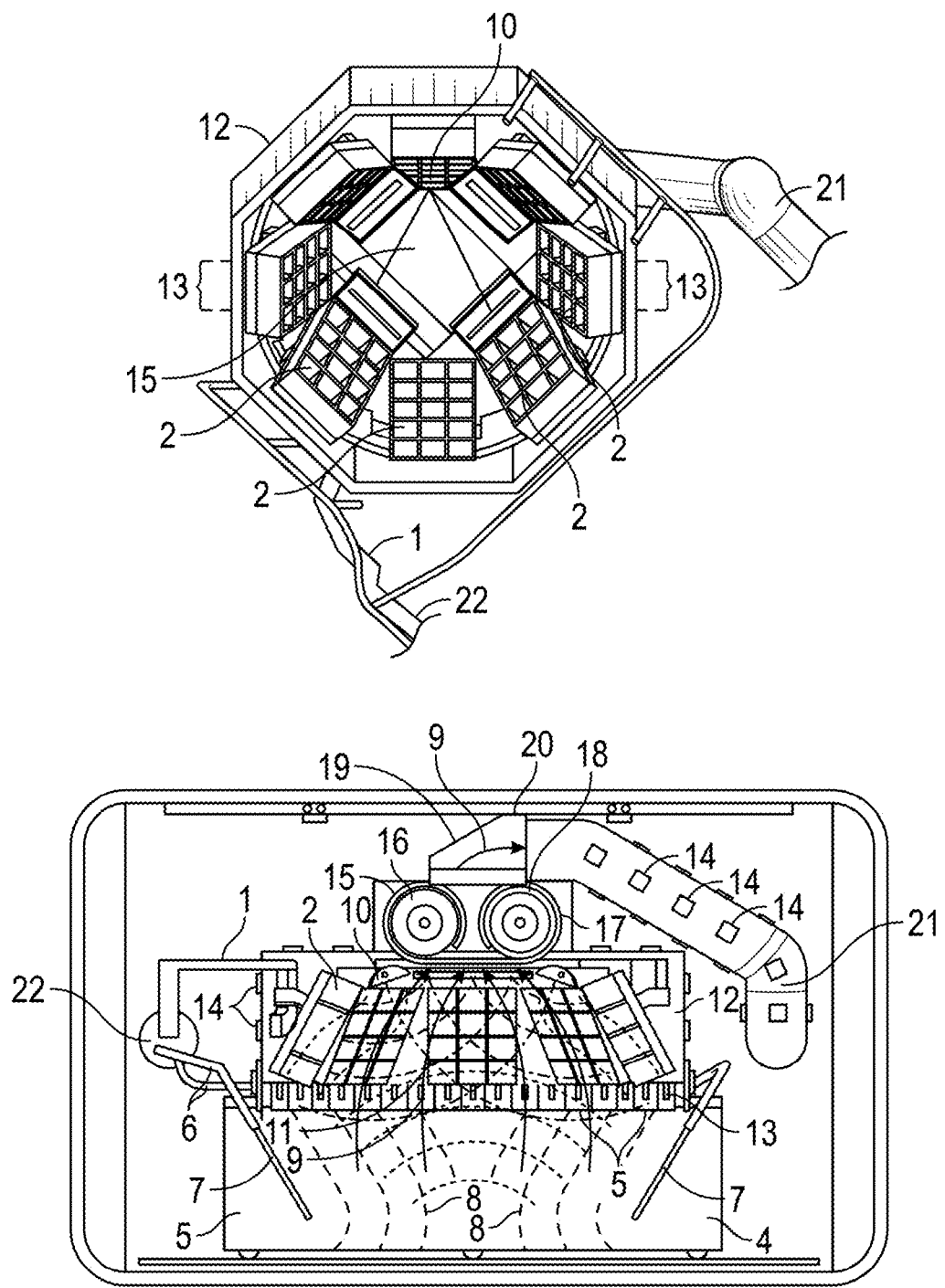
FIGS. 4A-4B are schematic illustrations of another embodiment of an apparatus or system for implementing RGD mining, including the use of radiant gas dynamic (RGD) mining implemented in a large scale rover design.
Figure 4B:
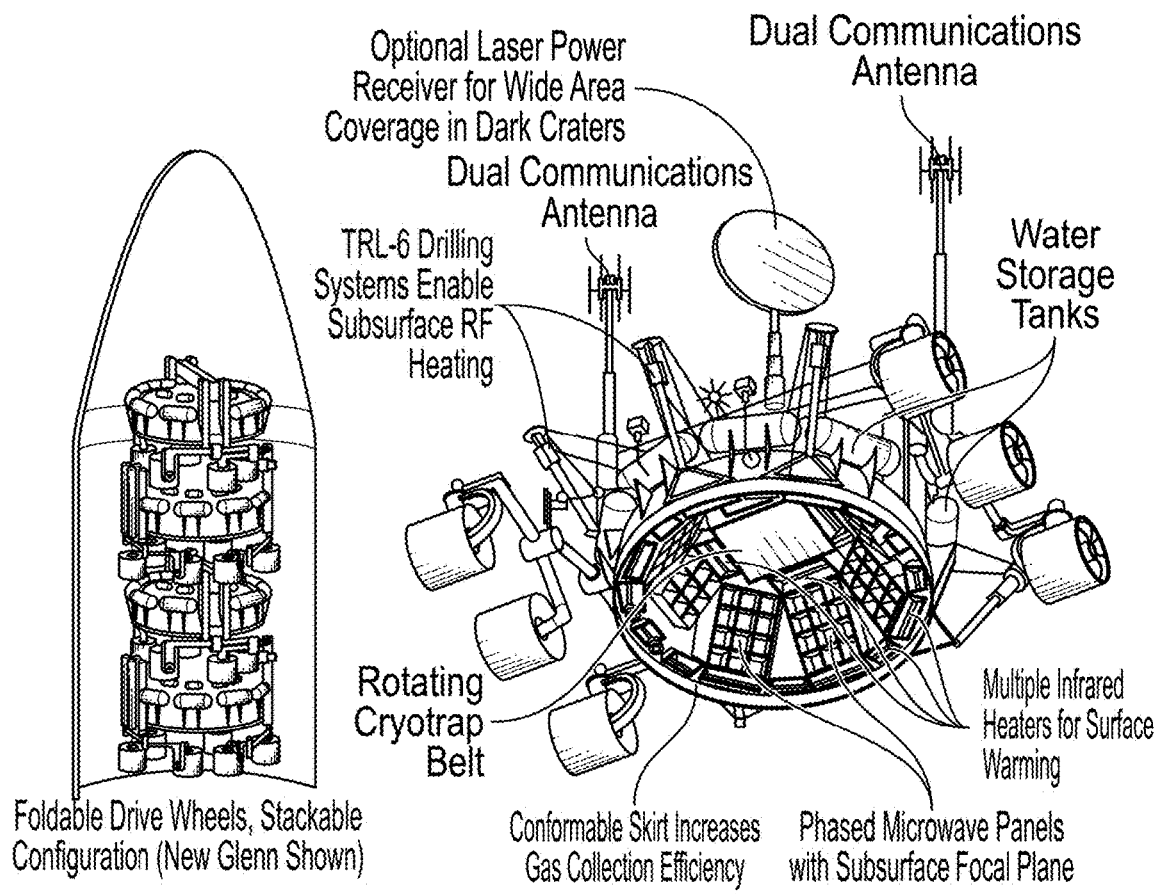

With reference to FIGS. 4A and 4B, the various features of one embodiment of an RGD mining apparatus and system will be described. As noted, these features may be incorporated into a roving vehicle or other mining apparatus or system. In this embodiment, with reference to FIG. 4A, the upper illustration shows the bottom perspective view of the dome structure of the mining apparatus, while the lower illustration is a side view. The various components illustrated in FIG. 4A are as follows:

1. Microwave Waveguide Network
  2. Focusing Microwave Panels (Eight)
  3. Microwave Wavefronts
  4. Simulated Regolith or Permafrost
  5. Simulated Surface Roughness
  6. High Power RF Coax Cables
  7. RF Dielectric Heating Probes (Six)
  8. RF Wavefronts
  9. Sublimated Water Vapor
  10. Radiant Infrared Heaters (Four)
  11. Infrared Radiation
  12. Gas Directing Dome Structure
  13. Surface Conforming Skirt Mechanism
  14. Resistive Patch Heaters (Many)
  15. Stainless Steel Cryobelt™
  16. Liquid Nitrogen Cooled Rotary Drum
  17. Water Vapor Collected as Frost
  18. Direction of Rotation
  19. Follower Closures
  20. Cryobelt™ Radiant Heater
  21. Roughing Pump Duct
  22. Vacuum System Port With reference to FIG. 4B, the upper left illustration shows a rover design in which foldable drive wheels and a stackable design allow the rover to be integrated as a payload in a space craft, such as the New Glenn. The upper right illustration shows a bottom perspective view of the rover, including the dome structure, while the lower two illustrations show two side views with the dome lowered to contact the surface and raised away from the surface.

Figure 4B:
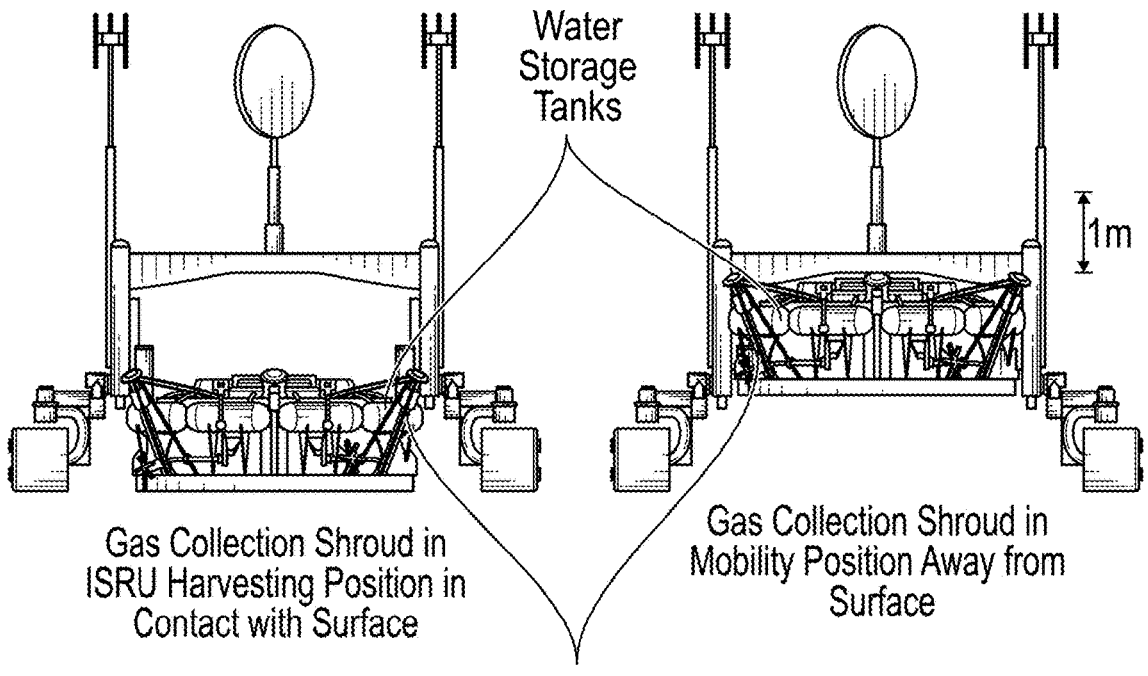

The dome has to support the eight microwave focusing panels, also referred to as waveguide slotted arrays (WGSA); the power divider waveguide network; the Cryobelt™ vapor collection assembly; and the skirt assembly that reduces the area for volatiles to escape at an efficiency level that we have modeled and accounted for in Table 1. The present design is a simple assembly based on standard materials and processes to the greatest extent possible. Materials have been chosen that are functional at cryogenic temperatures. The skirt assembly avoids cyclic flexing and associated fatigue risk, and also ensures that the leakage area between the dome and the lunar or Martian surface be much less than the cryopump area. The structure of the dome is an octagonally shaped, aluminum walled design which surrounds and supports the eight WGSAs and the power divider network as shown in FIG. 4.

Figure 5:
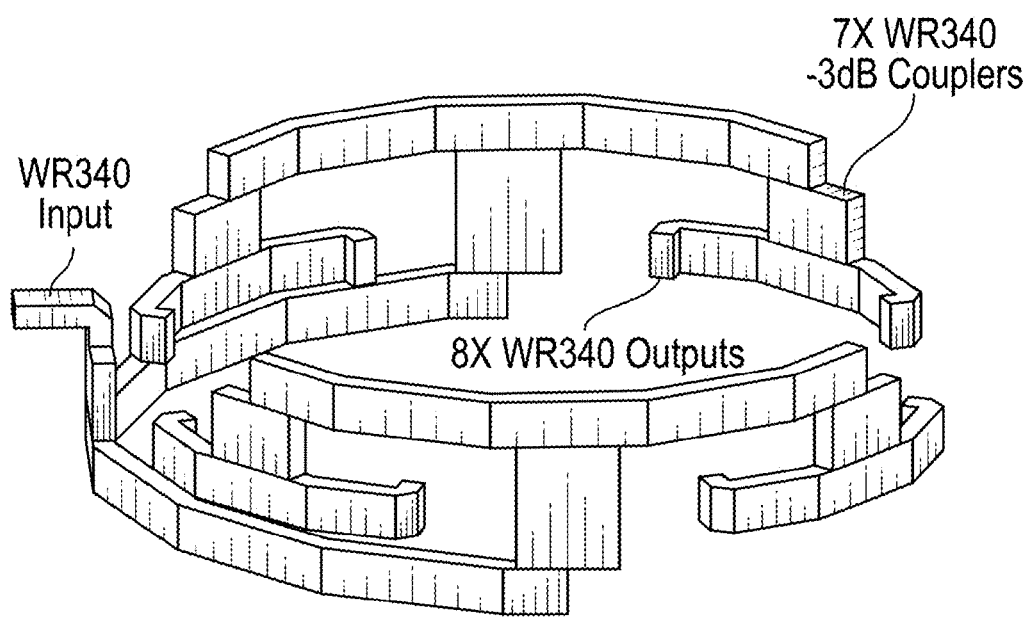
FIG. 5 is an illustration of one embodiment of a cylindrically oriented 1 to 8 waveguide power dividing network which splits power from the magnetron to the 8 WGSA focusing panels which direct the power into the permafrost.

Thus, with reference to FIG. 5, the arrays and the waveguide used in the power divider network are dip brazed Aluminum structures using COTS WR340 waveguide components and dimensions. The antennae and the waveguides are all sized to operate in the TE10 mode. Waveguide straight sections and bends are dip brazed together into individual pieces, and individual pieces are attached together using standard waveguide bolted flanges. A view of the divider assembly is also shown in FIG. 5.

The microwave design is an octagonal array consisting of elements in the near field of each other as shown in FIG. 4A. The electro-magnetic fields radiating from the elements are focused within a ~0.03 $m^3$ volume approximately 20 cm below the lunar surface. The rectangular waveguide elements were spaced one-half wavelength apart. The rectangular waveguide elements are 12×12 cm square and are excited by a TE10 mode with a given complex amplitude. The array consists of eight 3×4 rectangular arrays of these square, open-ended waveguide elements that are tilted downward at about 15 degrees to facilitate focusing of the beam as shown in FIGS. 4A and 4B.

Figure 6:
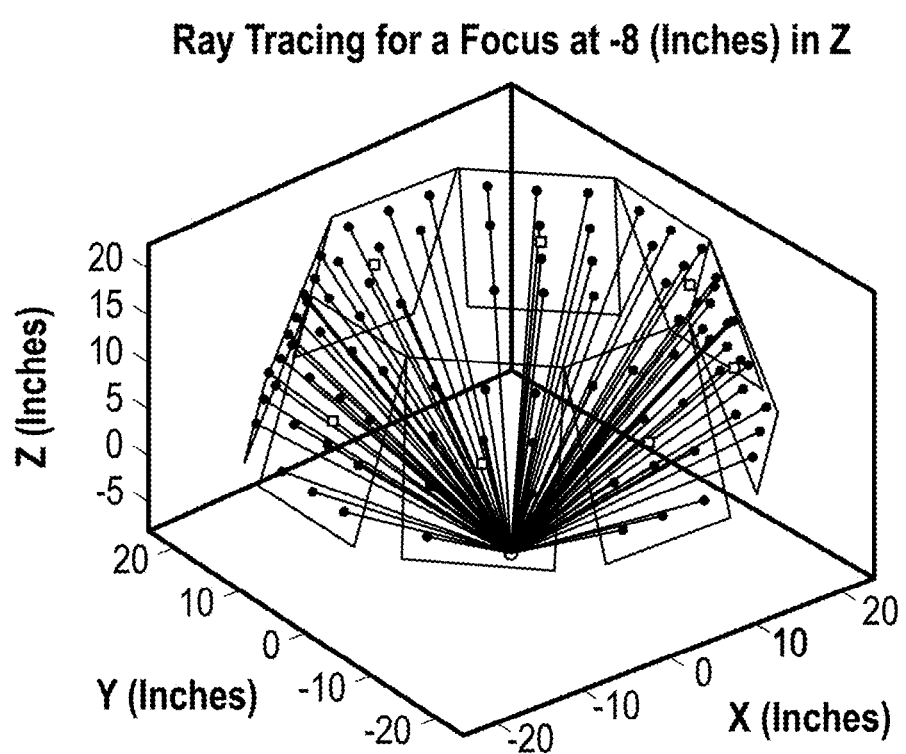
FIG. 6 illustrates the results of a ray trace analysis showing effectiveness of near field focusing of microwave power.
Figure 7:
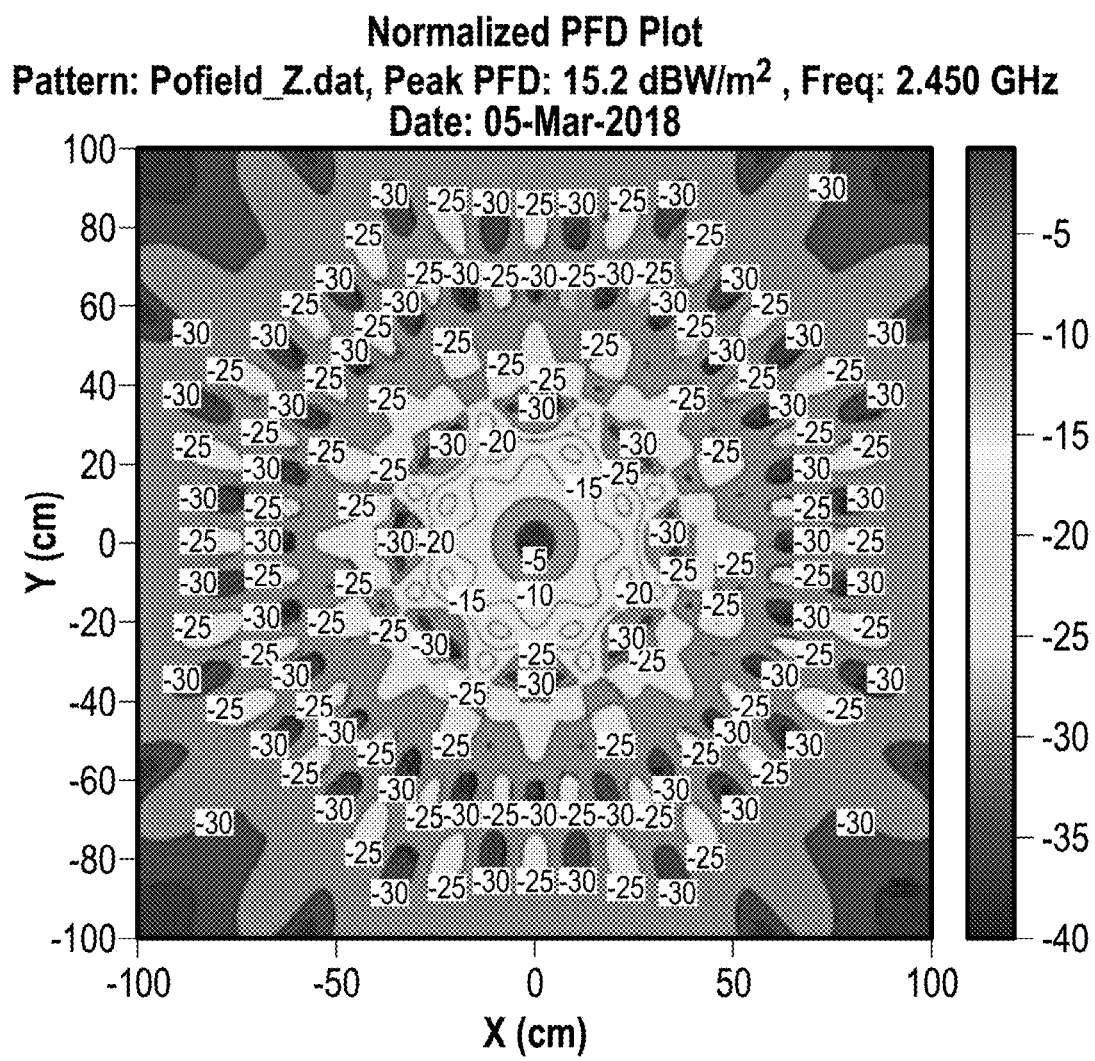
FIG. 7 illustrates the calculated potential field for downward focused near field microwave energy.
Figure 8:
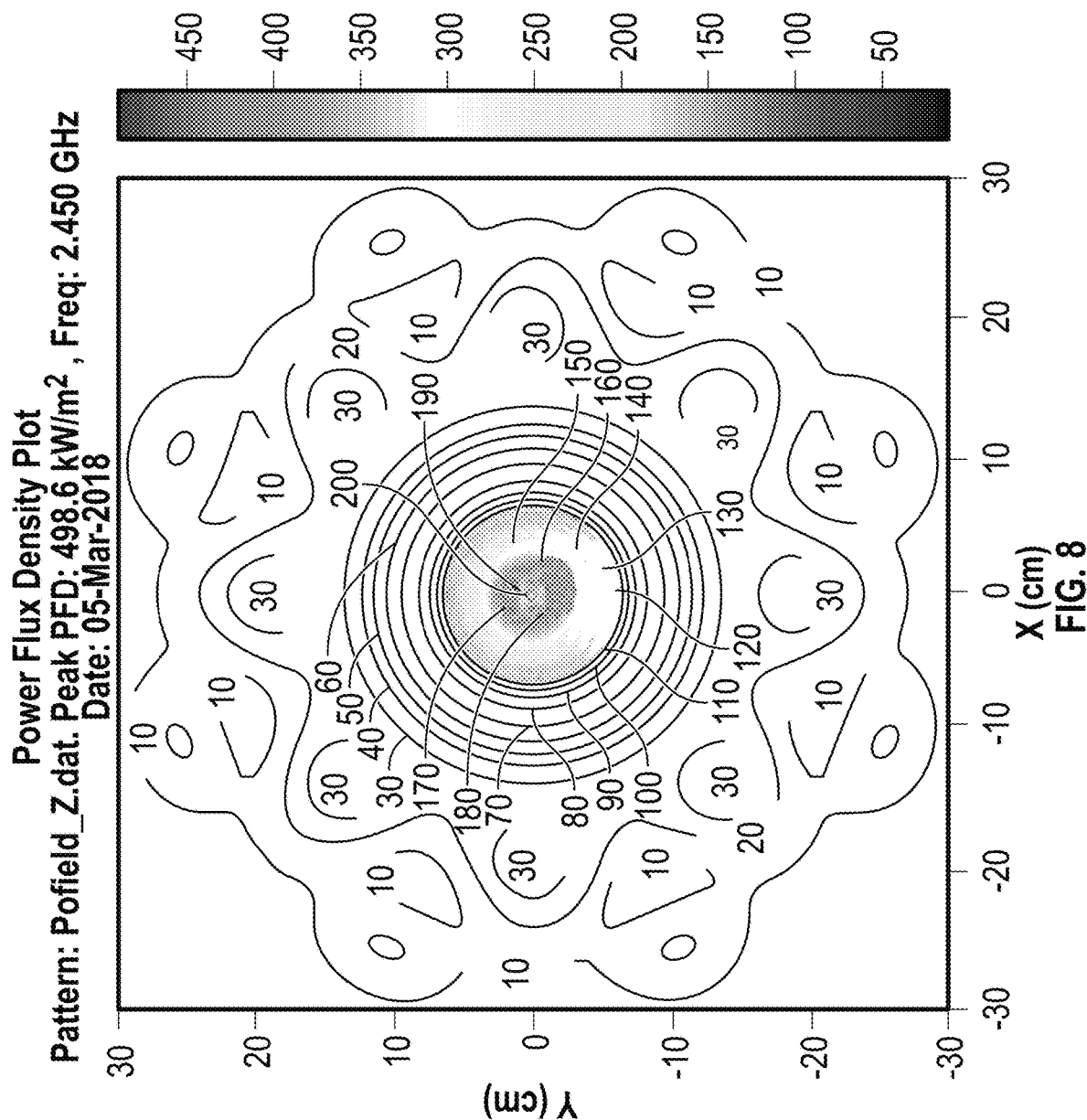
FIG. 8 illustrates the calculated power flux density for 15 kW S-band geometry with downward focusing phase shifters.

The apertures are located at the ends of lenses, which are phase shifters used to adjust the phase for each element. The WGSAs with lenses have been previously used and modeled. The complex amplitude and phase coefficients were adjusted using a conjugate phase approach. To determine the focusing capability with the conjugate phase approach, the fields were computed on a plane 20 cm below the array as the array was "focused" at different points along the Z-axis of the array. A ray trace diagram is provided in FIG. 6 showing how phase shifting of the 8 panels effectively directs the microwave energy down and toward the center of the system. This effect is also shown in FIG. 7, which is the potential field for the focused RF energy 20 cm below the bottom of the dome in the permafrost. The power density for the 15 kW S-Band system at the same 20 cm permafrost depth is shown in FIG. 8. Note that the power density profile suggests that the focusing system can deliver nearly all 15 kW into a small region ensuring optimal heating at depth to drive vapor into the dome system.

Two microwave frequencies, 915 MHz (L-Band) and 2.45 GHz (S-Band), are well suited for penetrating and volume heating of soils. Terrestrial uses of these frequencies include cooking, curing and drying of agricultural and many manufactured products. Magnetrons are used as power sources in these two bands because of their high electrical efficiency. DC to microwave conversion efficiency using magnetrons are about 80% at S-band and 90% at L-Band. L-Band commercial magnetron sources are available at continuous output power levels up to 140 kW. At 2.45 GHz, the highest power tube currently available can produce 15 kW of continuous output power. In certain embodiments, a 6 kW S-Band microwave system with magnetron, autotuner and waveguide feed system has been shown to be effective. In another embodiment, a 15 kW system is proposed.

Figure 9:
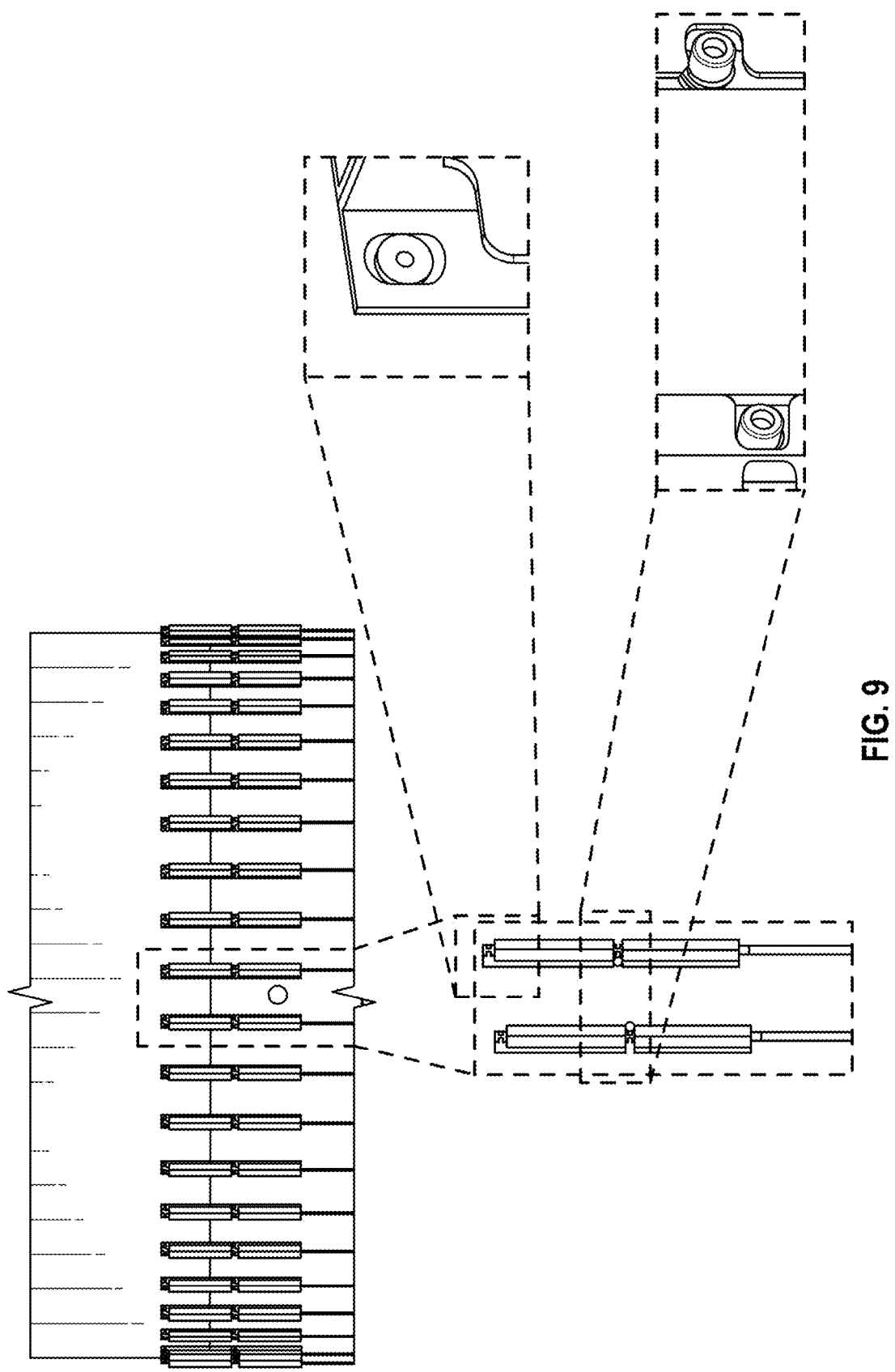
FIG. 9 illustrates the adaptive dome skirt assembly detail.

Moving from microwave design to mechanical design, the skirt assembly (FIG. 9), consists of 96 PTFE (Teflon) U-channels attached to the wall of the dome with two flathead screws each, through slots symmetrically located about the center and long enough to absorb the relative movement due to the delta CTE between the wall and the channel. The 48 movable skirt segments are each 10 cm wide by 30 cm tall by 0.5 cm thick and can slide +/−6 centimeters up and down, guided by the U-channel. Skirt segments are notched along a portion of their height to create captive features, and the fastener centered along the U-channel height acts as a stop preventing the skirt segments from sliding out of the U-channels.

Radio Frequency Dielectric Heating (RF Heating)

Radio Frequency Dielectric Heating (RF Heating) is common in industrial applications worldwide, but it is usually out-of-sight and never seen by the general public. Unlike infrared and microwave heating methods, RF Heating does not use radiating waves. The wavelengths at these lower frequencies are much longer than the objects to be heated. Strong alternating electric fields directly heat non-metallic insulating (dielectric) materials. In use, high RF voltages are applied to two spaced metal plates. A product to be heated is placed in-between the plates. A single RF Heater can cure the bonding agent in a layered stack of plywood in seconds. Such RF heating is also used in commercial bakeries to remove a controlled amount of water from biscuits or loaves of bread following initial baking. Both batch processing and continuous flow methods are used. RF Heating has also been used for site remediation in Hydrocarbon Contaminated Soils. (For a review article see: Radio Frequency Heating for Soil Remediation by Price et al, J. Air & Waste Manage. Assoc. 49:136-145, copyright 1995, incorporated herein in its entirety). In soil remediation, RF voltages are applied to one or more metal probes, which are inserted into the soil. Heating depths are determined by the length of the probes and may be many meters deep. The RF heating is used to elevate the temperature of deep soils and thereby increase the volatility of contaminating chemicals. The contaminating hydrocarbons are then removed by pumping ground water from surrounding well holes. Commercial RF Heating sources are available in power levels up to 500 kW continuous power output at ISM frequencies in the range of 3 to 30 MHz. With reference to RGD, it has been discovered that RF heating can be effective to extract water vapor from permafrost using a heating source comprising a 30 kW device operating at a frequency of 27 MHz.

There are two technical approaches in the commercial manufacture of high power RF heaters: the oscillator-amplifier approach and the free running oscillator approach. Both approaches are contemplated for RGD. However, in one embodiment, the free running oscillator approach is preferred as it is more cost effective, efficient and lower in mass for space applications. This architecture eliminates the stable frequency source, the amplifier chain, and the pi-network resonator. A free running power oscillator uses two high power triode tubes, similar to the final stage vacuum tubes in the oscillator-amplifier architecture. The power oscillator runs at a frequency determined by its connected inductor, vacuum capacitor, and the changing load impedance.

Its frequency will not stay within the ISM frequency bands. Therefore it must be operated in a well-shielded enclosure (like an all-metal vacuum chamber) or at a location that will not cause interference to general purpose radio communications (like the surface of the Moon). If the load impedance changes beyond the self-tuning limits of the free running oscillator, the oscillation simply stops. It is, to a large degree, self protecting. In one embodiment of a test apparatus, a commercially purchased RF Heater is coupled to electrodes imbedded in simulated regolith in vacuum. For this test, the RF Heater is located outside the vacuum enclosure. At each end of the regolith container, three ground penetrating probes are connected in parallel. No unusual modifications to the commercial RF heater are required. Internal to the vacuum chamber, the RF feed lines will be insulated with polyethylene to prevent glow discharge from forming along their length at moderate vacuum pressures. In this embodiment, the three penetrating probes at one end of the regolith container are connected in push-pull with the three probes at the other end. This will provide strong RF fields from end-to-end through the simulated regolith while leaving the vacuum chamber walls nominally at a neutral potential. A continuous RF shield between the power oscillator and the vacuum tank will prevent interfering RF emissions when the heater operating frequency drifts out of the ISM protected radio band.

Cryobelt™ Vapor Collector

Figure 10:
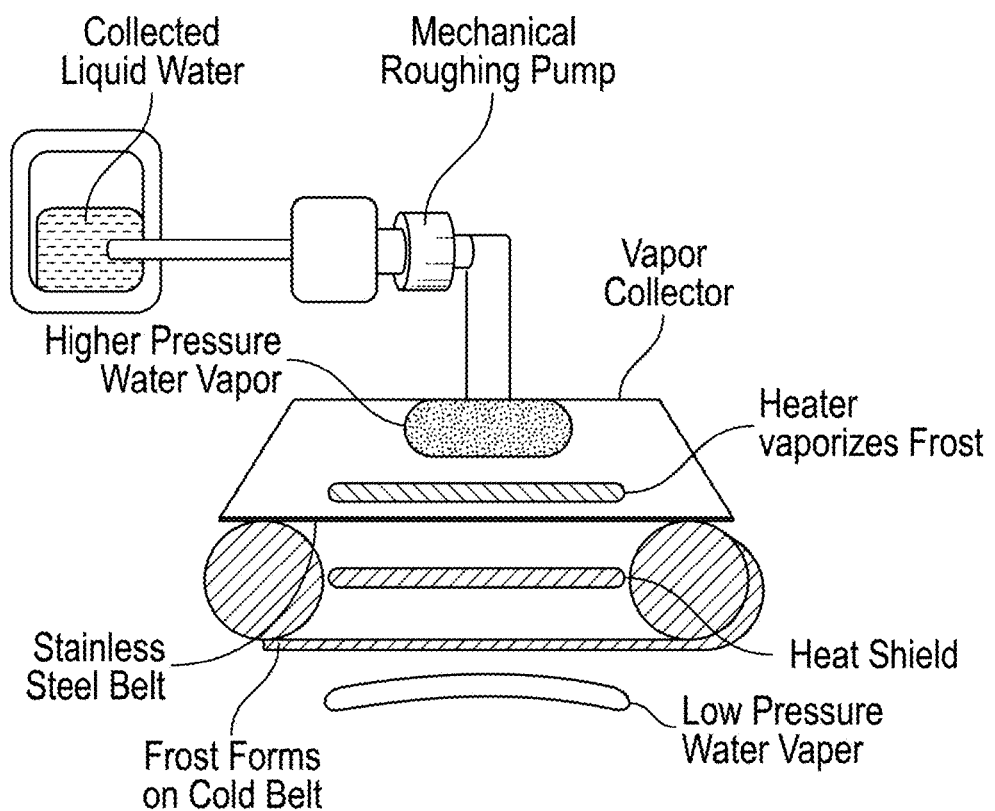
FIG. 10 schematic illustration of one embodiment of a Cryobelt™ system for cryotrapping.

In one embodiment, RGD mining incorporates a Cryobelt™ vapor collection device shown as items 15 through 22 in FIG. 4A. A schematic illustration of the Cryobelt™ is also shown in FIG. 10. The purpose of the Cryobelt™ in the context of RGD mining is to provide a very high pumping capacity continuous flow pumping system that can collect water vapor from inside the dome and deposit it as liquid into tanks. To understand the function of the Cryobelt™, one must understand that the conventional process of pumping water vapor at low ambient pressure can be very slow. If the ambient or partial pressure of water vapor is low, for example $10^{-3}$ bar=1 hPa, then the pump will deliver $10^{-3}$ times the mass of water that it would if pumping at standard pressure of 1 bar. Additionally, gas flow in the vacuum range of millibars is dominated by the mean free path distance for molecular collisions. For modestly sized collection pipes with tens of centimeters diameter, this flow region is characterized as viscous flow. Conventional vacuum designs are thus driven to very large pump capacity and largest possible collection pipes.

The Cryobelt™ is both a vapor collector and concentrator. It is shown schematically in FIG. 10. A rotating low conductivity stainless steel belt passes around two rollers, one chilled to cryotrapping temperature as shown. Roller rotation in the figure is counterclockwise. In this simplified view, water is emitted from the heated regolith and is collected as frost on the bottom surface of the Cryobelt™. At the top surface, the frost is flash evaporated to vapor. The vapor is collected and compressed to liquid water and stored. In the RGD application, everything below the roughing pump in the figure is in the RGD mining dome near the top of the dome.

A rotating belt of thin gauge stainless steel passes around two rollers. The rollers are cooled to liquid nitrogen temperatures. An exposed-element electric heater is placed above the top surface of the belt. It locally heats the belt. The belt is then cooled again when it passes around the cold rollers. Water vapor rises from the radiantly heated regolith. The waveguide surfaces and other objects below the Cryobelt™ are kept warm by electrical heaters to prevent condensation of water on their surfaces. Warm parts are arranged inside the dome to minimize view factors for radiative heat transfer to the bottom of the Cryobelt™. The bottom surface of the Cryobelt™ is cooled to near liquid nitrogen temperatures by contact with the cold rollers. Water vapor will quickly freeze to the belt. The frost is then transported around the rollers to the upper belt where it is flash vaporized and collected. The Cryobelt™ efficiently captures water vapor. It greatly increases the effective vapor capture area beyond what could be captured through conventional vacuum pipes operating in a closed pressure container. It mitigates the viscous pumping limitations of small pumping apertures. At the point of flash vaporization, the partial pressure of water vapor can be much higher than at the emitting surface of the regolith. It is this vapor concentrator that enhances the efficiency of follow-on mechanical pumping. The speed of the rotating belt is a free parameter and can be adjusted to accommodate changing emission rates from the regolith and control frost thickness. Scrapers not shown in FIG. 10 but shown in FIG. 4A enhance gas dynamic efficiency and minimize gas backflow.

Methods of Implementing RGD Mining in Lunar Craters

RGD mining can be implemented on lunar and Martian surfaces, as well as the surface of other celestial bodies, as described herein in various embodiments and in other embodiments apparent to those of ordinary skill. In one method, RGD mining can be implemented in carefully selected lunar craters where permafrost is found and solar power can be derived.

Figure 11:
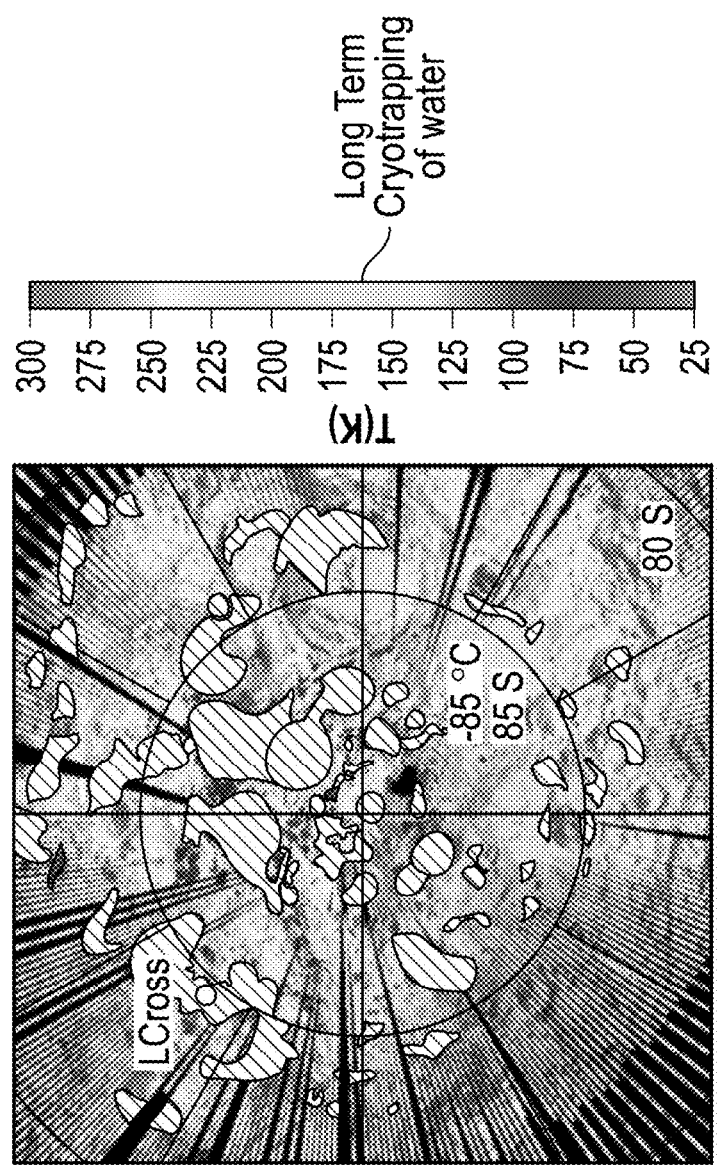
FIG. 11 illustrates the conditions surrounding the long-term cryotrapping of water.

Thus, FIG. 11 illustrates the Lunar South Polar Region showing the temperature profile of various craters. Temperatures below 115 K would allow for cryotrapping of water. Small craters with those temperatures are excellent candidates for a polar outpost. The present method is based lunar topography where analysis suggests that there are suitable (10,000 m2) landing areas in small (1 to 2 km) near-polar craters on which the surface is permafrost in perpetual darkness but with nearly perpetual sunlight available at altitudes of only ~100 m above ground. This is not true of larger craters where the vertical distance to sunlight is measured in km. See also FIGS. 2A-2D for additional information relating to the method as described herein.

In the proposed landing sites, deployable solar arrays held vertically on masts of only about 100 m in length (lightweight and feasible in lunar gravity) provide nearly continuous power. Therefore, large landers such as the Blue Moon proposed by Blue Origin, or the SpaceX Starship (formerly BFR), can feasibly deliver the power systems needed to both extract water (using the breakthrough RGD approach described herein) and process it into propellant via electrolysis and liquefaction. Perpetual darkness at ground level provides a naturally cold environment for easy radiation of waste heat to space for liquefaction and cryogenic storage of the produced propellants.

Figure 12:
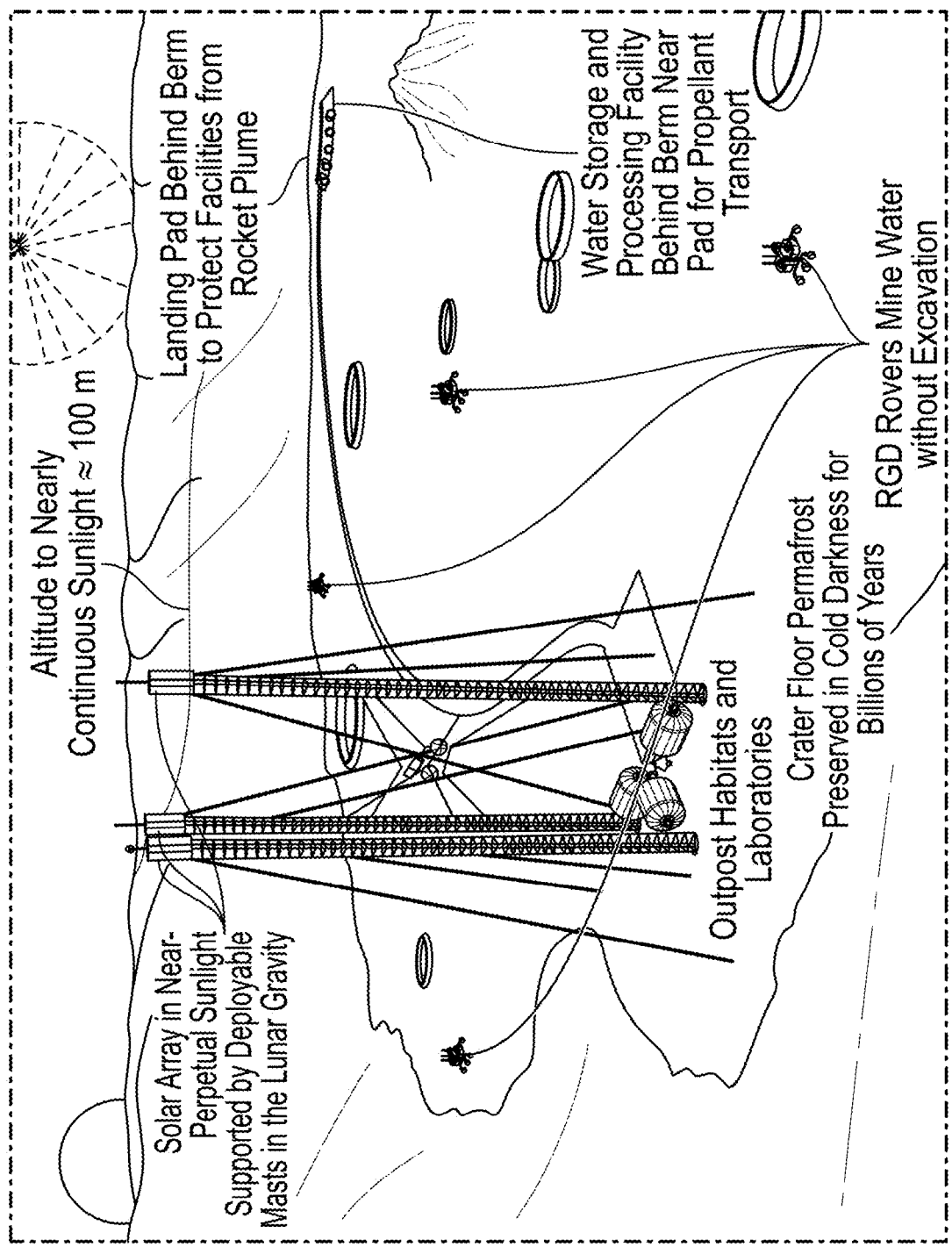
FIG. 12 is a schematic illustration of one embodiment of a method for landing and powering the implementation of RGD in selected lunar craters.

Therefore, FIG. 12 is a schematic illustration of the current method. This figure illustrates certain features of a lunar polar outpost situated in a crater chosen or selected in accordance with the principles described herein. The features of the outpost include solar arrays on masts, habitats, rover, propellant processing facilities, and landing areas. The Lunar Polar Propellant Mining Outpost (LPMO) as illustrated in FIG. 12 is a breakthrough in space propellant mining. It promises to greatly reduce the cost of human exploration, habitation, and industrialization of the Moon. LPMO will be humanity's first permanent beachhead on another planetary body and it will be economically sustainable based on the embodiments disclosed herein. The current apparatus, systems, and methods solve the problem of affordable lunar polar ice mining for propellant production.

In the current method, if converted into LOX/LH2 propellant in a modestly sized robotic plant, 1,000,000 kgs per year of H2O feedstock would be enough to supply a cislunar space transportation network ferrying payloads between Earth orbit and the lunar surface via a refueling depot at lunar L2. The magnitude of traffic supported by this propellant supply is more than sufficient to support the development and sustainment of a permanently inhabited lunar outpost and could later grow to support a sizable settlement and cislunar tourism industry enabled by these systems and methods in conjunction with commercial reusable launch systems. A complete propellant processing system, including a 3 MW power system, propellant processing and storage plants, and 5 RGD rovers, can be established on the surface of the moon within 24 months, requiring a total of 19 launches.

Thus, with reference to FIGS. 13A-13C, there is shown plan views of topographic slope and shadowing for a 1 km simple crater at 85° latitude as a function of degradation state. Fresh craters 13A have more area in shadow but steep non-traversable slopes. Moderately degraded craters 13B combine high shadow fraction with modest slopes, while highly degraded craters 13C have little to no permanent shadow.

Simple craters of less than about 2 km diameter at greater than about 85° latitude are selected to minimize the vertical distance between permanent shadow inside the crater and near-permanent sunlight at attainable mast heights above the crater floor. This analysis indicates that about 107 kg of ice can be expected to be accessible within the upper 5 m of surface material in a suitable 1 km diameter crater. This is enough water to close the business case for Lunar ISRU production over 10 years. It is estimated that there are about 102 such craters. Moderately degraded craters are favored because they have traversable wall slopes while still maintaining a substantial area of permanent shadow that would shrink with continued degradation, as shown in FIG. 13B.

Embodiments

Various embodiments are disclosed. For example, a method for mining lunar polar permafrost to extract gas propellants can include: identifying a plurality of near-polar landing sites in craters in which the surface comprises permafrost in perpetual darkness, wherein such landing sites have perpetual sunlight available at altitudes of about 100 to 200 meters; landing a mining outpost in at least one of the sites; deploying a high altitude solar array at the landing site using a lightweight mast having an appropriate height (e.g., a height in the range of 10 to 200 meters); generating near continuous power for the outpost using the high altitude solar array mast; and mining the permafrost at the landing site for volatiles to be used as propellant using radiant gas dynamic (RGD) mining procedures. Such RGD procedures can include, for example: providing a rover vehicle for mining the permafrost throughout the landing site, each rover combining RF, microwave, and infrared radiation to heat permafrost at a depth control heating profile; providing each vehicle with a deployable dome to be lowered to the surface, the dome having a conformable skirt to increase gas collection efficiency and a plurality of infrared heaters to warm the surface of the mining location; arranging on the interior surface of the skirt a phased array of microwave panels with a subsurface focal plane; deploying from the vehicle drilling devices to enable subsurface RF heating; sublimating ice at a predetermined depth, using a combination of radiation sources, to cause water vapor to migrate upward and out of the permafrost; using a rotating belt for capturing cryogenic vapors; and/or storing the vapor as a liquid in water storage tanks. Some of the above steps can be omitted or adjusted in some embodiments.

The crater referred to above can comprise a highly degraded crater with high shadow fraction and modest slopes. The lightweight mast can be at least about 100 meters tall. Alternatively, it can be between about 10 meters and about 100 meters tall. The rover vehicle can return to a storage facility when its water vapor tanks are full. The rover vehicle can mine permafrost for water vapor without excavation. The craters can comprise a set of craters at about 85 degrees latitude and a diameter of about 1 kilometer. Each one of the set of craters can have at least a portion in permanent shadow. The rover vehicle can comprise at least one integrated sensor for locating water. Overhead sensors can coordinate signals with the integrated sensor to locate water.

A system for mining permafrost on a lunar or Martian surface can include a rover vehicle and an integrated large area dome-shaped gas trapping enclosure. The system (e.g., the enclosure) can include a skirt comprising a conformal surface contact device for cryotrapping gases released from the surface. A multi-wavelength radiant heating system can provide adjustable heating as a function of depth. A drill system can be included for deploying subsurface RF sensors and RF transmitter antennas. A mast can be included, configured for deployment overhead for sensing instruments and/or surveying near the vehicle to find water. In-situ sensors can be included for providing ground truth against mast deployed range sensors. A satellite remote sensing system can be included and can integrate global, local and in-situ resource maps for finding water, for example.

The enclosure can be movable. For example, it can be raised for roving and lowered for mining. The radiant heating system can combine one or more of optical, infrared, microwave, and RF heating subsystems. In some embodiments, the radiant heating system can mine permafrost for water without excavation. The system can have at least one deployable mast for generating solar power for the rover vehicle. The mast can be high altitude. The rover vehicle can further comprise a cryopump. The system can have a radiant heating system that is configured to harvest water down to a depth of about a few meters. The radiant heating system can generate a variable heating profile in layers (e.g., using a phased array of emitting features). The system can include infrared and optical heating subsystems configured to heat some layers (e.g., near-surface material). The system can include microwave and RF heating subsystems configured to heat material in some layers (e.g., in intervening or other layers). The system can have a cryotrap configured to capture sublimated water vapor. The cryotrap can also (e.g., simultaneously) reduce and/or minimize re-freezing.

Accordingly, the present systems, methods, apparatus, and techniques for the in situ lunar or Martian removal of water from permafrost for the purpose of generating propellants represents a substantial advancement for space exploration.

What is claimed is:

1. A system for mining permafrost on a lunar or Martian surface, the system comprising:
   a rover vehicle configured to move about a surface having permafrost thereunder;
   a trapping enclosure comprising a walled container with an enclosed upper surface integrated into the rover vehicle and configured for deployment and redeployment, in multiple mining positions;

a skirt connected to the trapping enclosure and configured to contact the surface and encircle a mining space at the multiple mining positions, thereby containing material released from the surface;

a radiant heating system integrated into the rover vehicle and configured to direct heat at the surface, provide heating, and penetrate the surface, thereby releasing at least ice from the surface;

the trapping enclosure further configured to cooperate with the skirt to enclose the mining volume and trap the ice;

an ice collection apparatus integrated into the rover vehicle such that the ice collection apparatus penetrates the trapping enclosure to collect the ice from within the mining volume above the surface at the multiple mining positions; and a mobile ice storage container integrated into the rover vehicle and configured to accept the ice collected from the trapping enclosure and store the ice during movement of the rover vehicle.

2. The system of claim 1, wherein the rover vehicle is configured to return to a storage facility to empty the mobile ice storage container at the storage facility.

3. The system of claim 2, further comprising:
a battery integrated into the rover vehicle and configured to power the rover vehicle, wherein the battery is configured to be recharged at the storage facility.

4. The system of claim 1, wherein the trapping enclosure comprises a dome shape and is further configured to be lowered to contact the surface and raised away from the surface.

5. The system of claim 1, wherein the ice collection apparatus is further configured to collect the ice from the surface in the form of water vapor, compress the water vapor into liquid, and store the liquid in the mobile ice storage container.

6. The system of claim 1, further comprising:
a satellite remote sensing system configured to integrate global, local, and/or in-situ resource maps for locating water.

7. The system of claim 1, further comprising:
a solar array integrated into the rover vehicle and configured to receive light redirected from a solar array mast deployed within a predetermined distance of the mining positions.

8. The system of claim 1, wherein the radiant heating system comprises a free funning power oscillator configured to generate the heat so as to sublimate the ice to release the ice form the surface in the form of water vapor.

9. The system of claim 8, wherein the trapping enclosure is further configured to cryotrap the water vapor released from the surface.

10. The system of claim 1, wherein the skirt comprises a plurality of skirt segments, each of the skirt segments configured to move up and down individually.

11. The system of claim 1, wherein the radiant heating system comprises a plurality of radio frequency (RF) transmitters configured to conduct RF heating currents into subsurface material to heat ice in the subsurface material content in order to melt and vaporize the subsurface ice for capture by the ice collection apparatus.

12. The system of claim 1, wherein the radiant heating system comprises a radio frequency (RF) heating including a free running power oscillator to generate the heat using one or more high power triode tubes.

13. The system of claim 1, wherein the ice collection apparatus comprises:
two rollers,
a belt configured to pass around the two rollers, wherein the belt is configured to collect the released ice on a bottom of the belt in the form of frost, and
an electric heater positioned above the belt and configured to heat a top of the belt to evaporate the frost into vapor.

14. The system of claim 1, further comprising:
a drilling system configured to deploy radio frequency (RF) sensors and RF transmitter antennas below the surface, wherein the RF sensor and RF transmitters are configured to map a subsurface environment around the rover vehicle to determine subsurface ice content.

15. A rover vehicle, comprising:
a trapping enclosure comprising a walled container with an enclosed upper surface configured for deployment and redeployment, in multiple mining positions on a surface having permafrost thereunder;

a skirt connected to the trapping enclosure and configured to contact the surface and encircle a mining space at the multiple mining positions, thereby containing material released from the surface;

a radiant heating system configured to direct heat at the surface, provide heating, and penetrate the surface, thereby releasing at least ice from the surface, the trapping enclosure further configured to cooperate with the skirt to enclose the mining volume and trap the ice;

an ice collection apparatus penetrating the trapping enclosure to collect the ice from within the mining volume above the surface at the multiple mining positions; and a mobile ice storage container configured to accept the ice collected from the trapping enclosure and store the ice during movement of the rover vehicle.

16. The rover vehicle of claim 15, wherein the rover vehicle is configured to return to a storage facility to empty the mobile ice storage container at the storage facility.

17. The rover vehicle of claim 16, further comprising:
a battery configured to power the rover vehicle, wherein the battery is configured to be recharged at the storage facility.

18. The rover vehicle of claim 15, wherein the trapping enclosure is further configured to be lowered to contact the surface and raised away from the surface.

19. The rover vehicle of claim 15, wherein the ice collection apparatus is further configured to collect the ice from the surface in the form of water vapor, compress the water vapor into liquid, and store the liquid in the mobile ice storage container.

20. The rover vehicle of claim 15, further comprising:
a satellite receiver configured to integrate global, local, and/or in-situ resource maps for locating water.

21. The rover vehicle of claim 15, further comprising:
a solar array configured to receive light redirected from a solar array mast deployed within a predetermined distance of the mining positions.

22. The rover vehicle of claim 15, wherein the radiant heating system comprises a free funning power oscillator configured to generate the heat so as to sublimate the ice to release the ice form the surface in the form of water vapor.

23. The rover vehicle of claim 22, wherein the trapping enclosure is further configured to cryotrap the water vapor released from the surface.

24. The rover vehicle of claim 15, wherein the skirt comprises a plurality of skirt segments, each of the skirt segments configured to move up and down individually.

25. The rover vehicle of claim 15, wherein the radiant heating system comprises a plurality of radio frequency (RF) transmitters configured to conduct RF heating currents into subsurface material to heat ice in the subsurface material content in order to melt and vaporize the subsurface ice for capture by the ice collection apparatus.

26. The rover vehicle of claim 15, wherein the radiant heating system comprises a radio frequency (RF) heating including a free running power oscillator to generate the heat using one or more high power triode tubes.

27. The rover vehicle of claim 15, wherein the ice collection apparatus comprises:
two rollers,
a belt configured to pass around the two rollers, wherein the belt is configured to collect the released ice on a bottom of the belt in the form of frost, and
an electric heater positioned above the belt and configured to heat a top of the belt to evaporate the frost into vapor.

28. The rover vehicle of claim 15, further comprising:
a drilling system configured to deploy radio frequency (RF) sensors and RF transmitter antennas below the surface, wherein the RF sensor and RF transmitters are configured to map a subsurface environment around the rover vehicle to determine subsurface ice content.

* * * * *